(12) United States Patent
Morrison et al.

(10) Patent No.: US 8,591,039 B2
(45) Date of Patent: Nov. 26, 2013

(54) IMAGE PROJECTION METHODS AND INTERACTIVE INPUT/PROJECTION SYSTEMS EMPLOYING THE SAME

(75) Inventors: Gerald D. Morrison, Calgary (CA);
Paul Anthony Auger, Osgoode (CA);
Mark Andrew Fletcher, Nepean (CA);
Gregory Gordon Forrest, Calgary (CA); Holly Pekau, Calgary (CA)

(73) Assignee: SMART Technologies ULC (CA)

( * ) Notice: Subject to any disclaimer, the term of this patent is extended or adjusted under 35 U.S.C. 154(b) by 663 days.

(21) Appl. No.: 12/259,583

(22) Filed: Oct. 28, 2008

(65) Prior Publication Data
US 2010/0103330 A1 Apr. 29, 2010

(51) Int. Cl.
*G03B 21/14* (2006.01)
*G03B 21/00* (2006.01)
*H04N 3/22* (2006.01)
*H04N 3/26* (2006.01)

(52) U.S. Cl.
USPC .............................. 353/82; 353/122; 348/745

(58) Field of Classification Search
USPC ..................... 353/69, 70, 28, 48, 46, 82, 122; 348/745
See application file for complete search history.

(56) References Cited

U.S. PATENT DOCUMENTS

| | | | |
|---|---|---|---|
| 6,219,011 B1 * | 4/2001 | Aloni et al. | 345/1.3 |
| 6,431,711 B1 * | 8/2002 | Pinhanez | 353/69 |
| 6,554,431 B1 * | 4/2003 | Binsted et al. | 353/28 |
| 7,593,024 B2 | 9/2009 | Andrews et al. | |
| 2005/0012911 A1 * | 1/2005 | Cambron | 353/122 |
| 2005/0168700 A1 | 8/2005 | Berg et al. | |
| 2006/0158425 A1 * | 7/2006 | Andrews et al. | 345/156 |
| 2006/0221063 A1 * | 10/2006 | Ishihara | 345/173 |
| 2006/0227292 A1 * | 10/2006 | Lawrence | 353/28 |
| 2007/0242233 A1 | 10/2007 | Sokeila et al. | |
| 2009/0085828 A1 | 4/2009 | Lee et al. | |

OTHER PUBLICATIONS

Lee et al., Automatic Projector Calibration with Embedded Light Sensors, UIST '04,Oct. 24-27, 2004, Santa FE, New Mexico.
Beardsley, P., Baar, J.V., Raskar, R., and Forlines, C. (2004). Interactive Projection. Aug. 2004 Available at: <http://www.merl.com/publications/TR2004-107/>.
Raskar, R.; van Baar, J.; Chai, J.X., "A Low-Cost Projector Mosaic with Fast Registration", Asian Conference on Computer Vision (ACCV), Jan. 2002, Available at : <http://www.merl.com/publications/TR2002-014/>.
Cao, X. and Balakrislman, R. (2006). Interacting with dynamically defined information spaces using a handheld projector and a pen. ACM UIST Symposium on User Interface Software and Technology. p. 225-234.
Transmittal; International Search Report; and Written Opinion of the International Searching Authority for International Application No. For PCT/CA2009/001504.
Supplementary European Search Report for European Patent Application No. 09 82 2922 with a mailing date of Jul. 17, 2012.

* cited by examiner

*Primary Examiner* — William C Dowling
*Assistant Examiner* — Ryan Howard
(74) *Attorney, Agent, or Firm* — Katten Muchin Rosenman LLP

(57) ABSTRACT

An image projecting method comprises determining the position of a projection surface within a projection zone of at least one projector based on at least one image of the projection surface, the projection zone being sized to encompass multiple surface positions and modifying video image data output to the at least one projector so that the projected image corresponds generally to the projection surface.

7 Claims, 31 Drawing Sheets

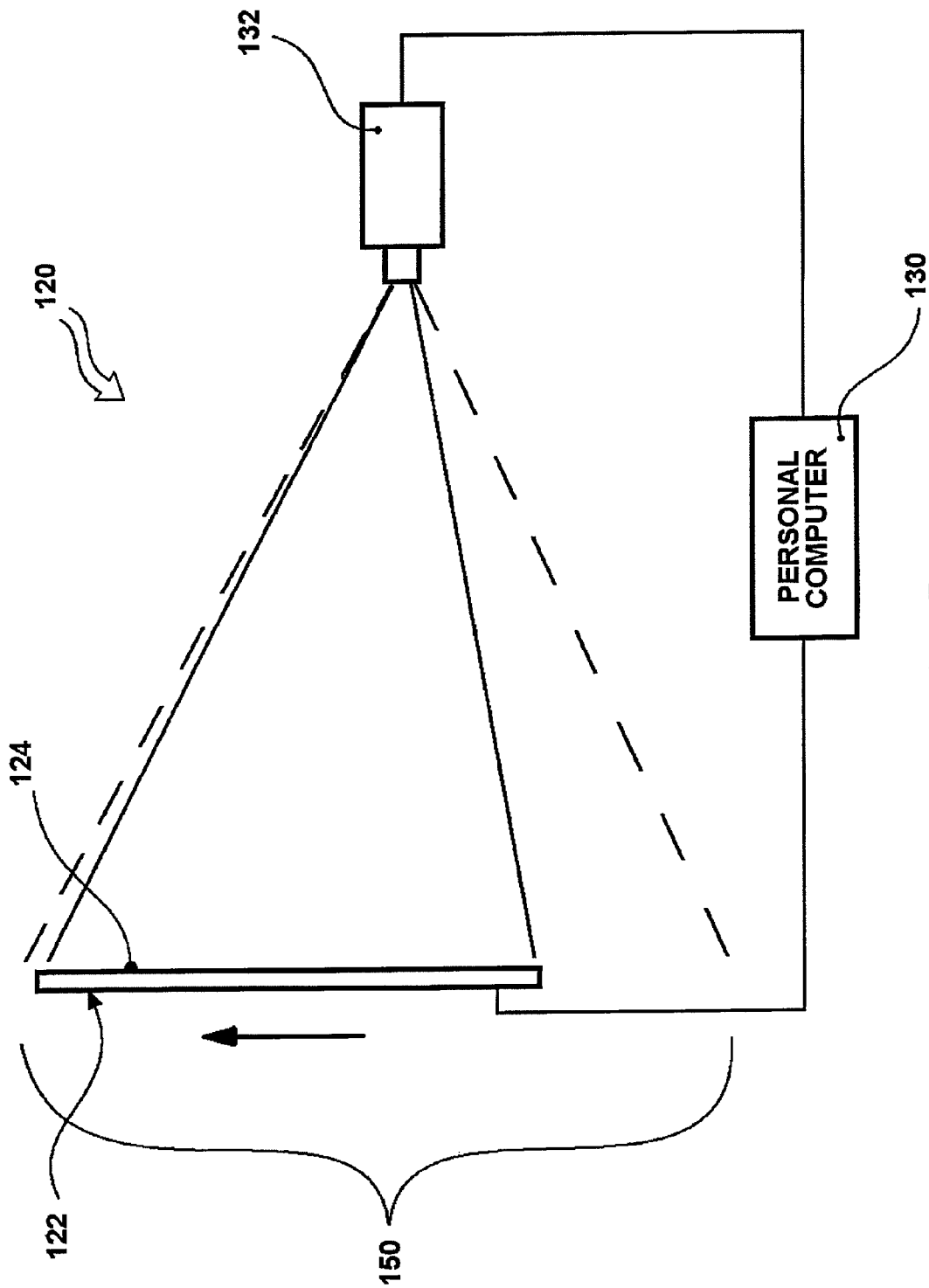

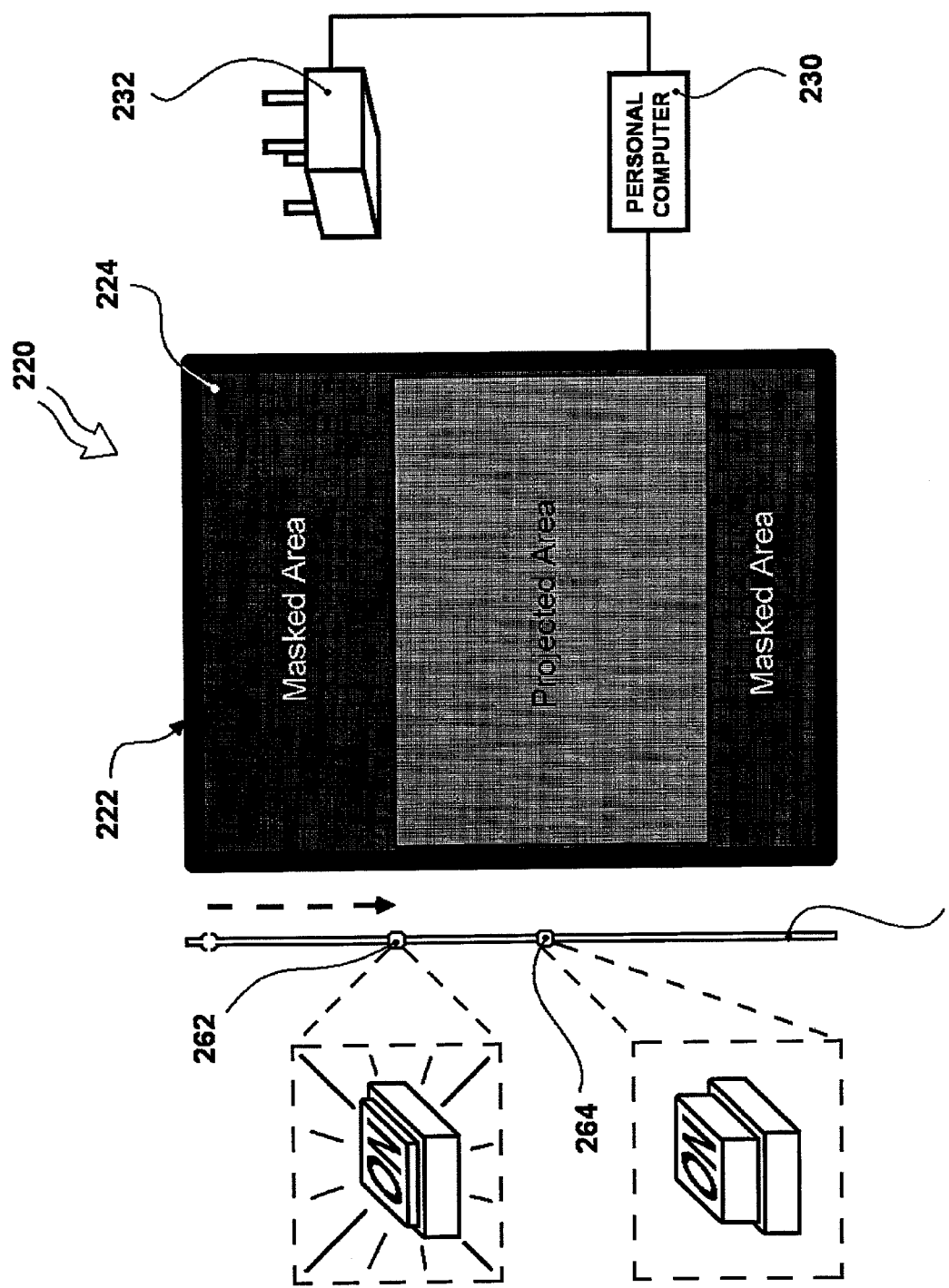

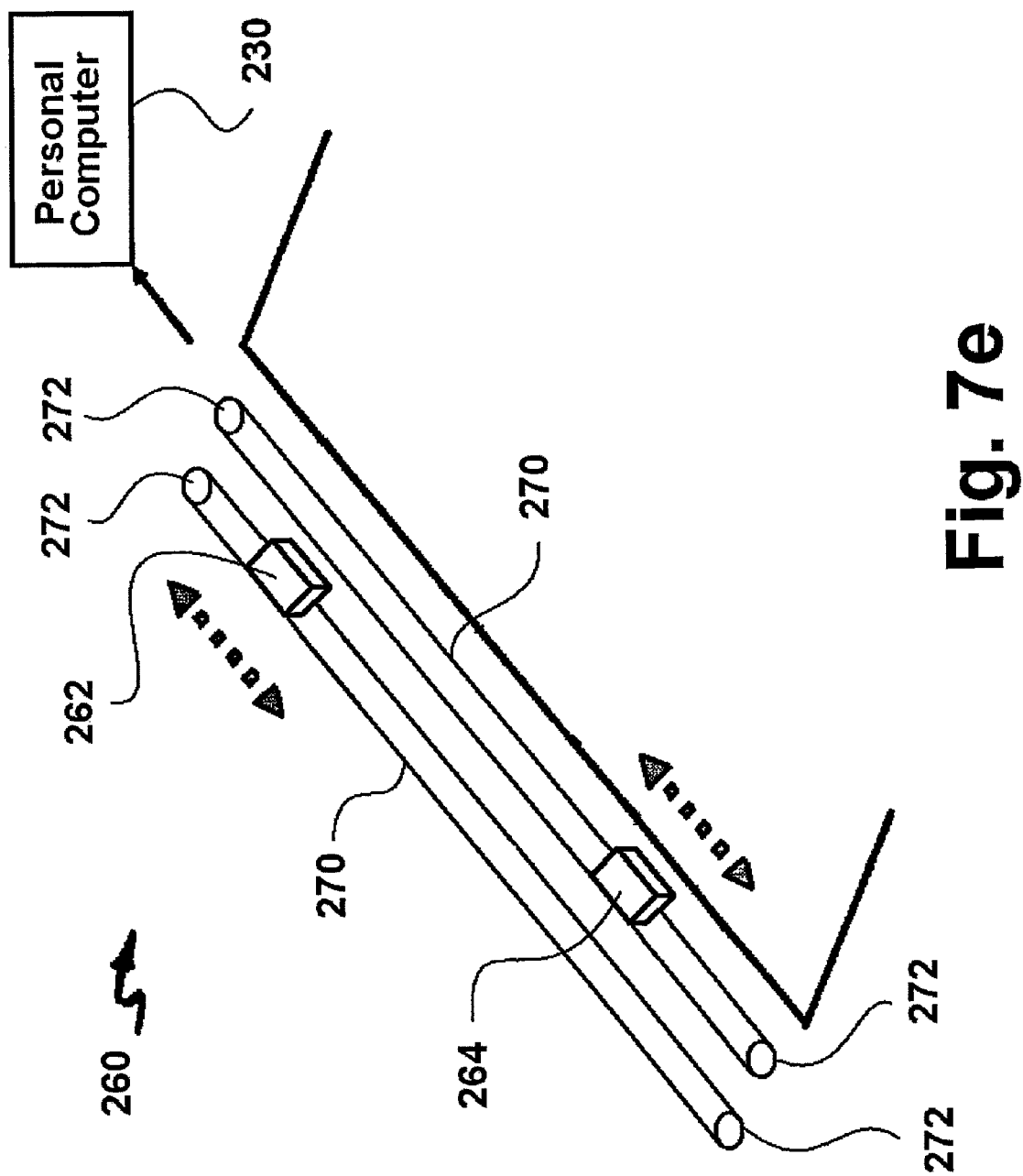

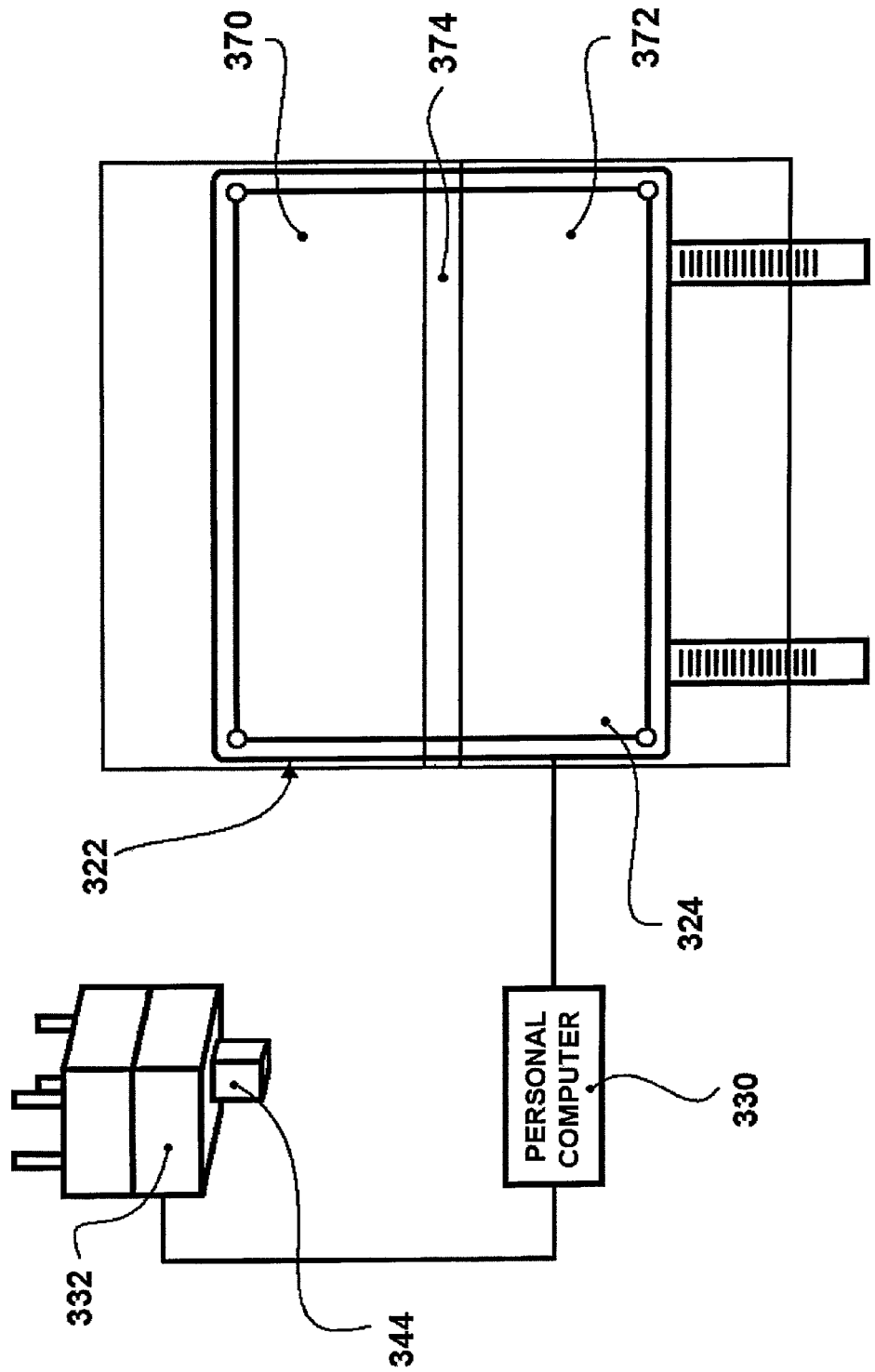

OR

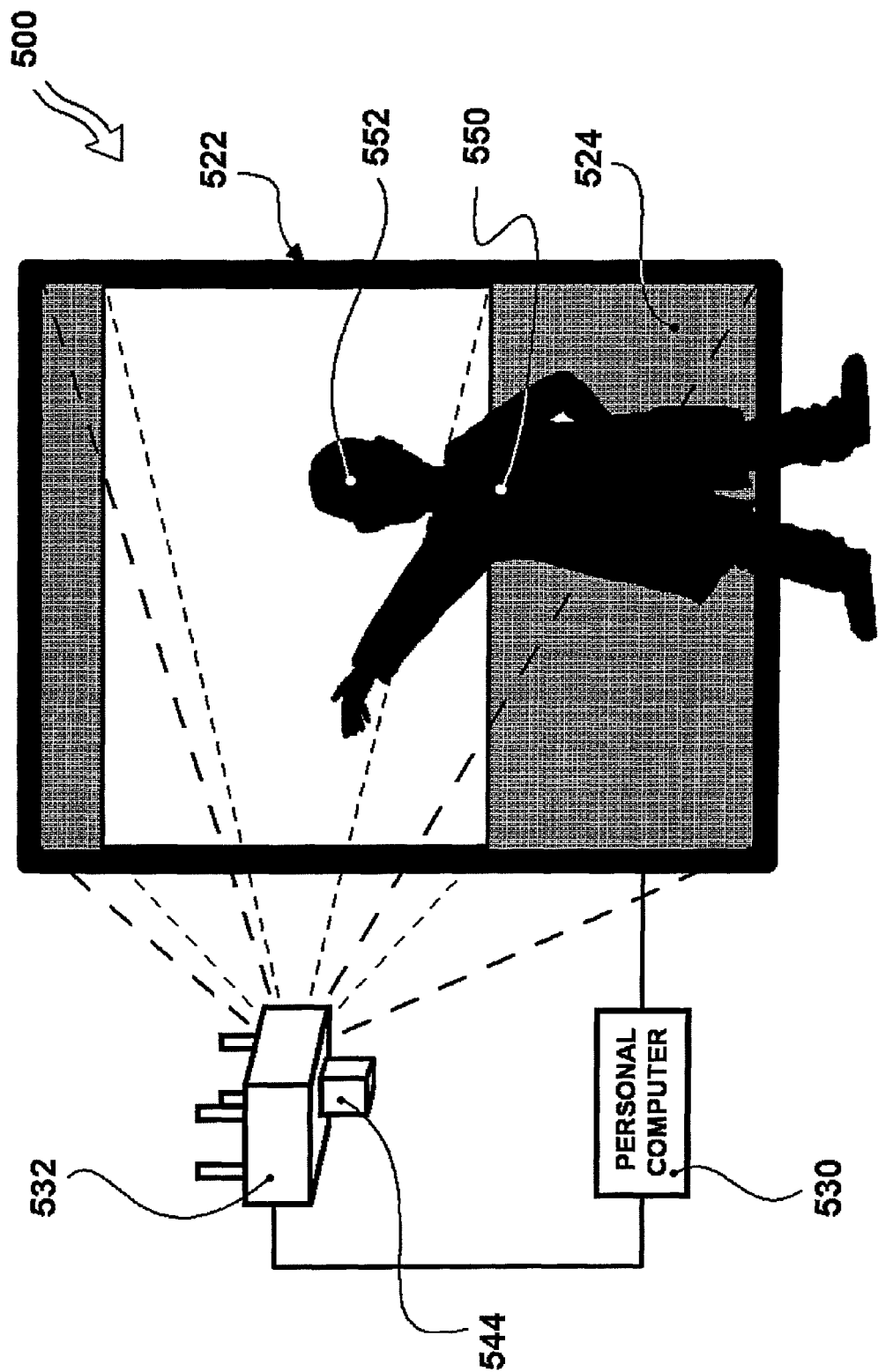

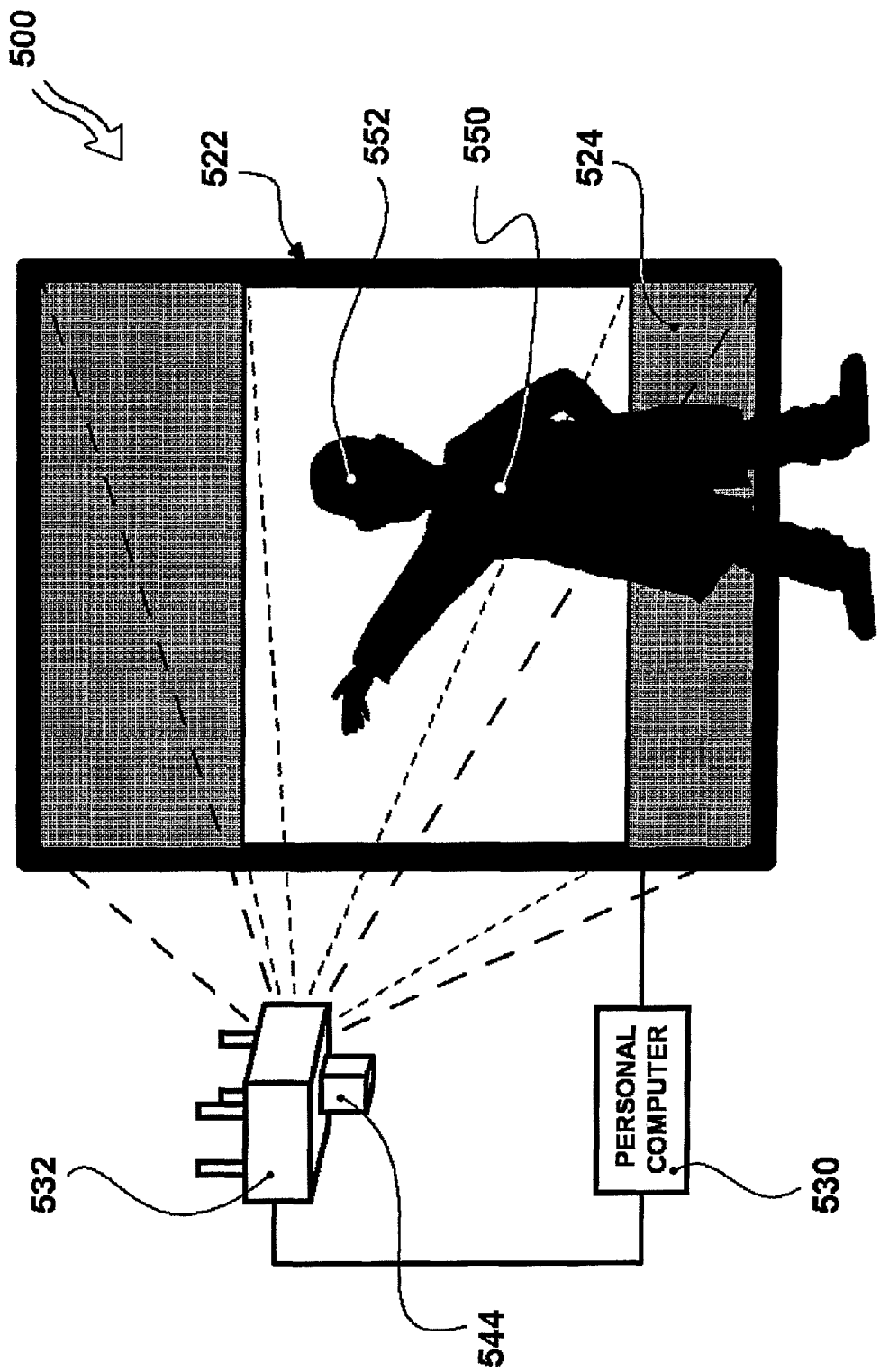

IMAGE PROJECTION METHODS AND INTERACTIVE INPUT/PROJECTION SYSTEMS EMPLOYING THE SAME

FIELD

The present specification relates generally to interactive input/projection systems and in particular to image projection methods and interactive input/projection systems employing the same.

BACKGROUND

Interactive input systems that allow users to inject input (e.g. digital ink, mouse events, etc.) into an application program using an active pointer (e.g. a pointer that emits light, sound or other signal), a passive pointer (e.g. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

When using an interactive input system in a teaching or presentation environment, it is common to mount the touch panel on a wall surface or to support the touch panel on a stand or the like and use a projector to project a computer-generated image onto the touch surface of the touch panel. Often, the touch panel is fixed in position at a height to accommodate users of an average height. This of course can create ergonomic problems as tall users must hunch over to use the touch panel and short users must stretch to use the touch panel. Hunching over for extended periods of time can result in back problems and stretching for extending periods of time can lead to shoulder problems. Providing the ability to adjust the vertical height of the touch panel helps to solve these problems and also allows the touch panel to be used by users of significantly different heights as is commonly the case in school environments where both the teacher and young students need to interact with the touch panel. As will be appreciated, upper regions of the touch panel are simply out of reach of most young students when the touch panel is positioned to facilitate use by the teacher. Although allowing the touch panel to move vertically to accommodate users of different height helps, problems exist in that each time the touch panel is moved, the projector image must be re-aligned with the touch panel. Projectors that include adjustable lens assemblies to enable the projected image to track movement of the touch panel are extremely expensive and as a result have proven to be simply unsuitable.

An interactive input system comprising a touch panel and a boom supporting a projector at one end that are integrated to form a single assembly, has been considered. In this interactive input system, when the vertical height of the touch panel is adjusted, the boom moves with the touch panel thereby to maintain alignment of the projector image with the touch panel. Although this interactive input system addresses the alignment issue noted above, the integrated touch panel and boom assembly is mechanically complex making it expensive. Also, an expensive short throw projector is required in order to minimize the size of the boom. In environments where cost is of primary concern such as in teaching environments, this type of interactive input system has also proven to be unsatisfactory. Furthermore, in environments such as primary schools where the touch panel needs to be lowered significantly to accommodate very small users, the boom may be lowered to a position where it poses a hazard to teachers and other taller users.

The publication entitled "Automatic Projector Calibration with Embedded Light Sensors" authored by Lee et al. (UIST October 2004, Santa Fe, N. Mex.) discloses a calibration system comprising a projector, a set of light sensors embedded in the target surface of a projection screen and a computer for sending pre-warped images to the projector. A sequence of structured light patterns is projected over the projection screen that allows each sensor to discover its location. This sensor location data is reported to the computer which in turn pre-warps the image data conveyed to the projector so that the projected image corresponds with the projection screen. Although this reference discloses a technique for adjusting a projected image so that it fits onto a projection screen there exists a need to improve interactive input/projection systems.

It is therefore an object of the present invention to provide novel image projection methods and interactive input/projection systems employing the same.

SUMMARY

Accordingly, in one aspect there is provided an image projecting method comprising:

determining the position of a projection surface within a projection zone of at least one projector based on at least one image of said projection surface, said projection zone being sized to encompass multiple surface positions; and modifying video image data output to the at least one projector so that said projected image corresponds generally to said projection surface.

According to another aspect there is provided an image projection method comprising:

capturing at least one image of a moveable display surface and processing the at least one image to determine the position of the display surface within a projection zone of a projection device;

masking the projection zone based on the display surface location to crop the projection zone; and projecting an image corresponding to the cropped projection zone so that said image is presented generally only on said display surface.

According to yet another aspect there is provided an image projecting method comprising:

projecting an image onto a surface using at least one projector, said projected image corresponding generally to said surface and forming a sub-region of the projection zone of said at least one projector, said projection zone having a vertical dimension that is sized to encompass multiple vertical positions of said surface; and when the vertical position of the surface is changed, moving the projected image in a vertical direction so that the projected image generally tracks said surface in response to user input.

According to yet another aspect there is provided an image projecting method comprising:

detecting output signifying a desired location of at least one boundary of an image to be projected on a projection surface; and modifying video image data output to at least one projector so that the at least one boundary of said projected image is positioned on said projection surface substantially at said desired location.

According to yet another aspect there is provided an image projection method comprising:

determining an ergonomic position for an image to be projected onto a touch surface based on a user parameter; and projecting the image on said touch screen at said ergonomic position.

According to still yet another aspect there is provided an image projection system comprising:

at least one projector projecting an image onto a surface, said image occupying a subset of the projection zone of said at least one projector; and processing structure modifying image data output to the at least one projector to adjust the position of said image within said projection zone based on received image position information.

BRIEF DESCRIPTION OF THE DRAWINGS

Embodiments will now be described more fully with reference to the accompanying drawings in which:

FIGS. 5a and 5b are schematic side and front illustrations respectively, of an alternative interactive input/projection system with the touch panel in an upper position;

FIGS. 7a to 7d are schematic illustrations of yet another interactive input/projection system;

FIGS. 7e and 7f are illustrations showing alternative track designs for the interactive input/projection system of FIGS. 7a to 7d;

FIGS. 9a and 9b are schematic illustrations of yet another interactive input/projection system;

FIGS. 12a and 12b are schematic illustrations of still yet another interactive input/projection system.

DETAILED DESCRIPTION OF THE EMBODIMENTS

Figure 1:
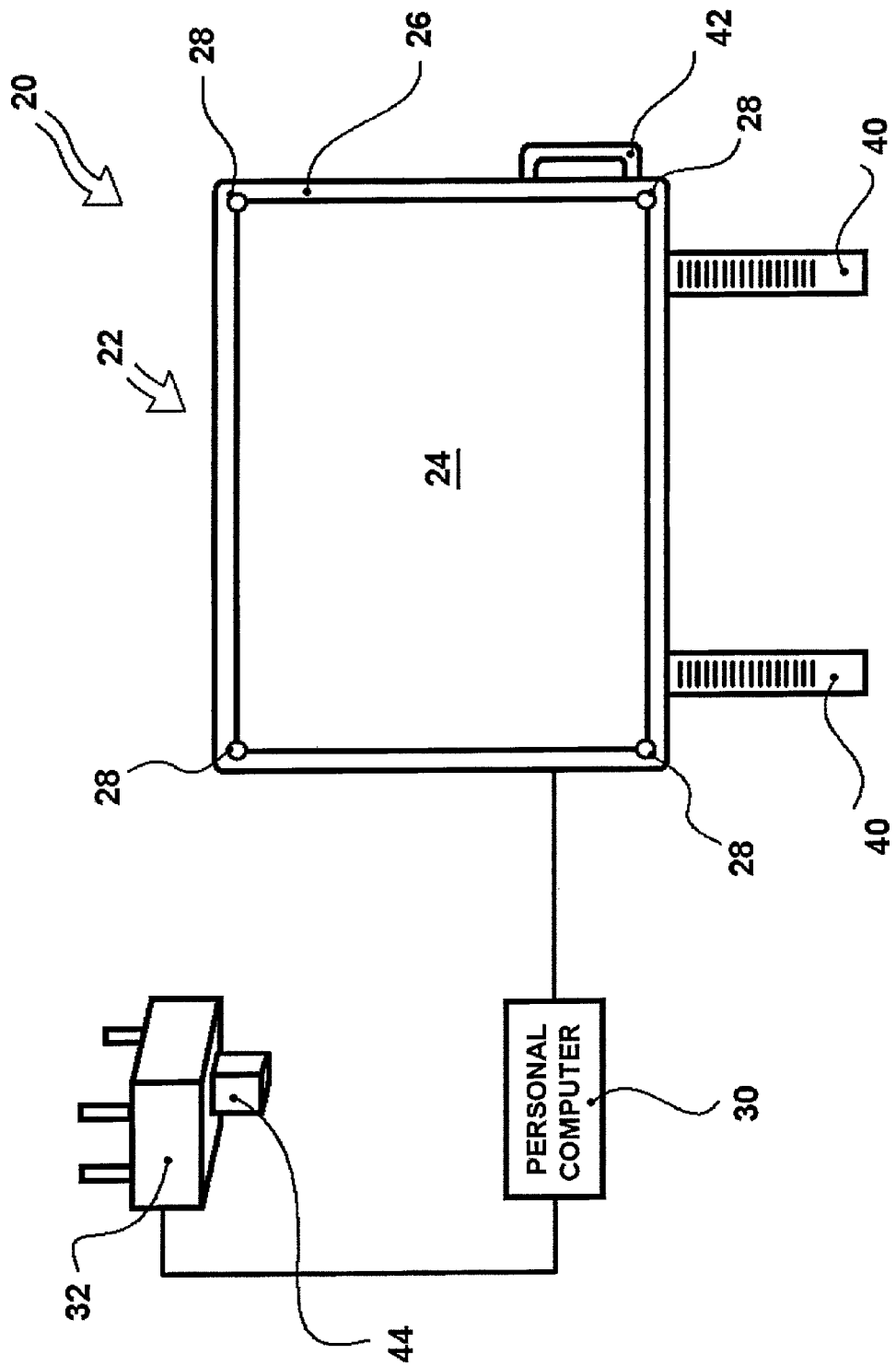
FIG. 1 is a schematic illustration of an interactive input/projection system comprising a moveable touch panel.

Turning now to FIG. 1, an interactive input/projection system is shown and is generally identified by reference numeral 20. As can be seen, interactive input/projection system 20 comprises a touch panel 22 having a touch surface 24 surrounded by a bezel or frame 26. As is well known, the touch panel 22 is responsive to pointer interaction allowing pointer contacts on the touch surface 24 to be detected. The touch panel 22 may employ analog resistive or machine vision technology to register pointer (i.e. finger, object, pen tool etc.) interaction with the touch surface 24 such as those disclosed in above-incorporated U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada. Alternatively, the touch panel 22 may employ electromagnetic, capacitive, acoustic or other technologies to register pointer interaction with the touch surface 24.

In this example, an infrared (IR) light emitting diode 28 (LED) is positioned adjacent each corner of the bezel 26. The IR LEDs 28, when illuminated, visually mark the corners of the touch surface 24. The touch panel 22 communicates with a processing device such as for example a personal computer 30. The personal computer 30, which executes one or more application programs, processes pointer interaction data received from the touch panel 22 and provides video data output to a projector 32 that reflects pointer activity. The projector 32 in response to received video data from the personal computer 30, projects an image that is aligned with and sized to correspond to the size of the touch surface 24. Thus, the touch panel 22, personal computer 30 and projector 32 form a closed-loop so that pointer interaction with the touch surface 24 can be recorded as writing or drawing or used to control execution of application programs executed by the personal computer 30.

The touch panel 22 is mounted on a pair of generally vertical tracks 40 fastened to a wall surface or the like and is slidable along the vertical tracks 40 allowing the vertical height of the touch panel 22 to be adjusted. An adjustment mechanism 42, in this example a handle is provided on one side of the bezel 26 to facilitate vertical adjustment of the touch panel 22. Of course other adjustment mechanisms such as for example, cranks, levers, counter-weights, hydraulics, motors etc. can be employed to assist movement of the touch panel 22 along the tracks 40. A camera device 44 positioned adjacent to or integral with the projector 32 communicates with the personal computer 30. The camera device 44 is oriented so that its field of view at least encompasses the touch panel 22. In this example, the camera device 44 is a low resolution, low cost webcam.

As will be appreciated, depending on the height of the user interacting with the touch panel 22, ease of access to the upper and lower regions of the touch surface 24 will vary depending on the vertical position of the touch panel 22 along the tracks 40. For taller users, positioning the touch panel 22 adjacent the top of the tracks 40 typically facilitates touch panel interaction, while for shorter users, positioning the touch panel 22 adjacent the bottom of the tracks 40 typically facilitates touch panel interaction. Regardless of the position of the touch panel 22 along the tracks 40, it is necessary for the image projected by the projector 32 to remain aligned with the touch surface 24 of the touch panel 22.

Figure 2:
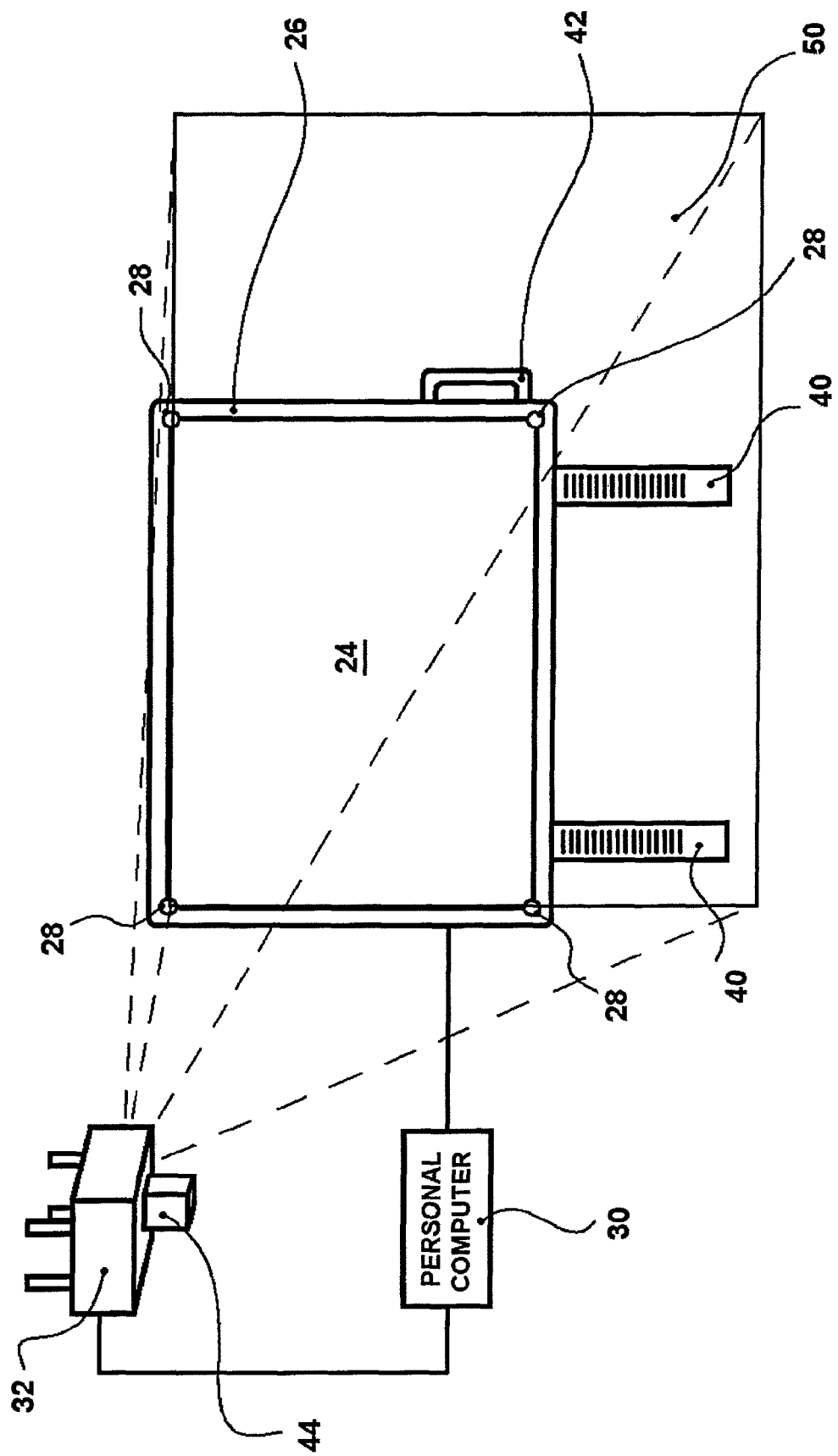
FIG. 2 is another schematic illustration of the interactive input/projection system of FIG. 1 showing over-projection of an image.

To achieve this alignment, the interactive input/projection system 20 uses over projection in combination with an image adjustment technique to enable the image projected by the projector 32 to remain aligned with the touch surface 24 irrespective of the position of the touch panel 22. In particular, the lens system of the projector 32 at installation is configured so that the projection zone 50 of projector 32 covers a region that at least encompasses all possible positions of the touch panel 22 along the tracks 40 as shown in FIG. 2. During image adjustment, the position of the touch panel 22 within the projection zone 50 is determined by the personal computer 30 and a mask 52 is created to truncate the projection zone 50 to a region 54 corresponding to the touch surface 24 (see FIGS. 3 and 4). Following this, the personal computer 30 modifies the video data output to the projector 32 so that the projected image is resized to fit within the region 54 and appears substantially only on the touch surface 24 of the touch panel 22. Further specifics of the image adjustment technique will now be described.

In order to determine the position of the touch panel 22 within the projection zone 50, each image frame captured by the camera device 44 is processed by the personal computer 30 to locate the four (IR) LEDs 28 and hence, determine the four corners of the touch surface 24. Based on the locations of the IR LEDs 28 in each image frame, the personal computer 30 creates the mask 52 that is used to crop the projection zone 50. The personal computer 30 then modifies the video data output to the projector 32 in accordance with the created mask 52 so that the projected image is aligned with and corresponds to the touch surface 24.

Figure 3:
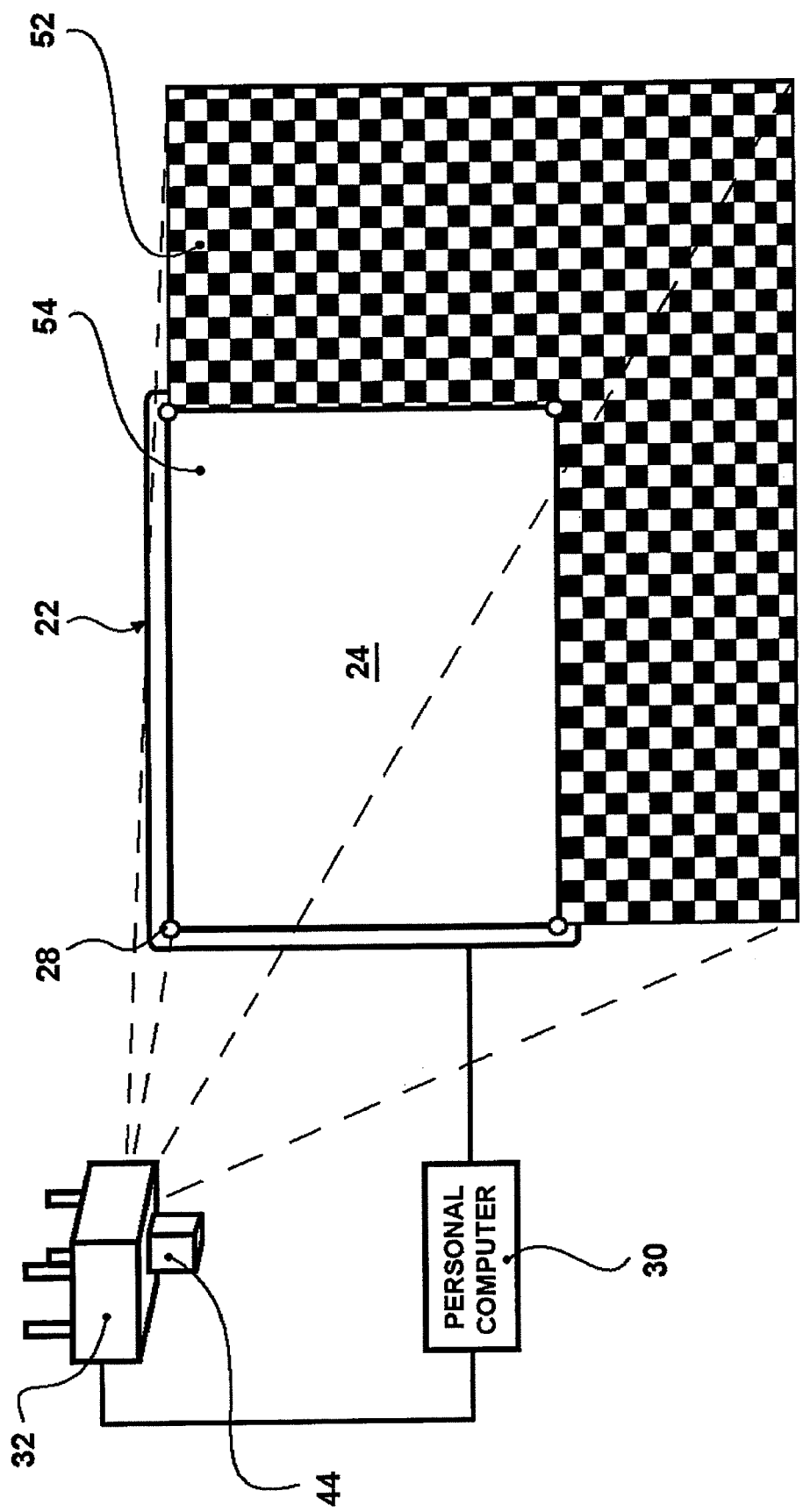
FIG. 3 is another schematic illustration of the interactive input/projection system of FIG. 1 with the touch panel at an upper position.
Figure 4:
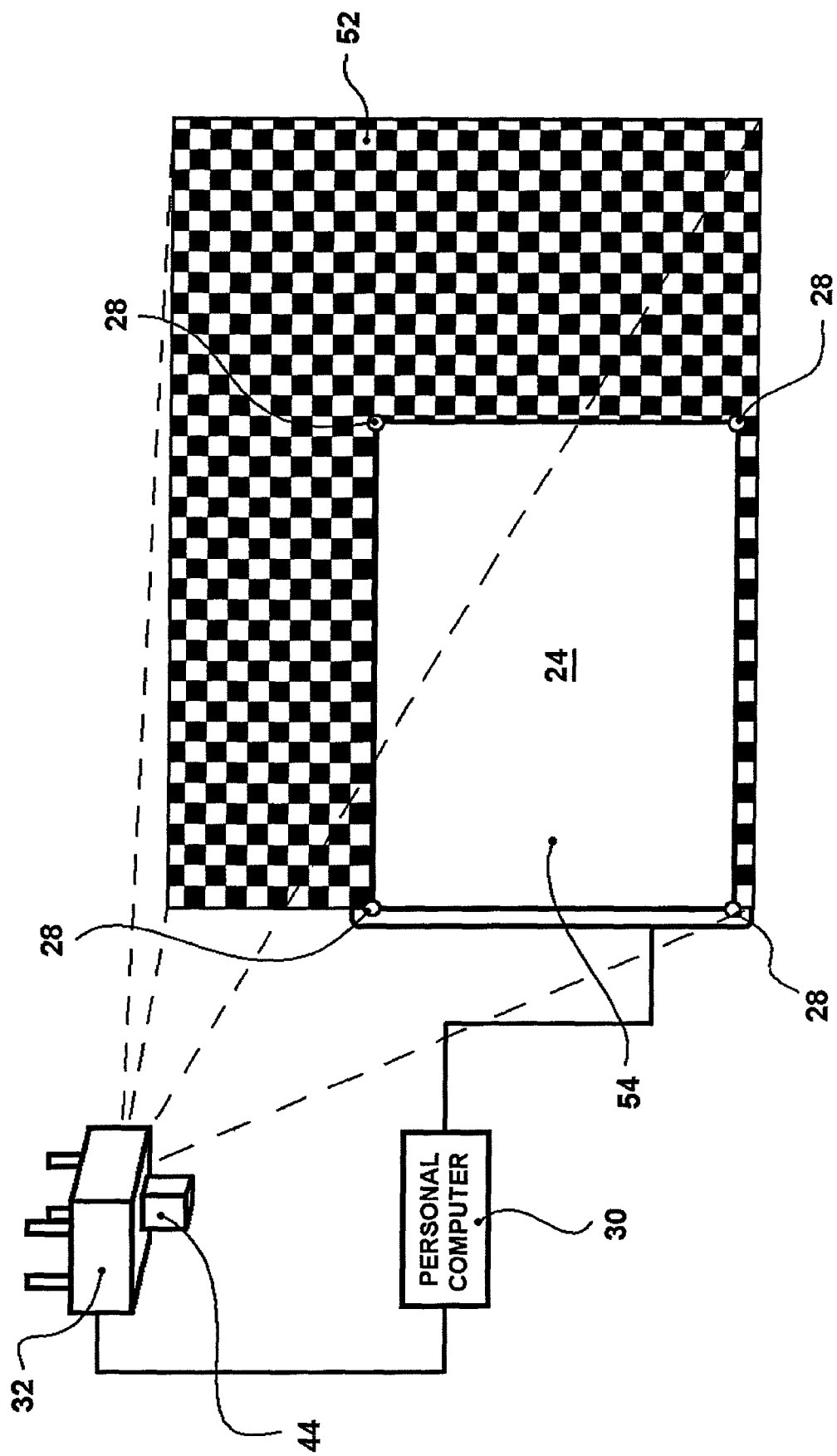
FIG. 4 is another schematic illustration of the interactive input/projection system of FIG. 1 with the touch panel at a lower position.
Figure 5B:
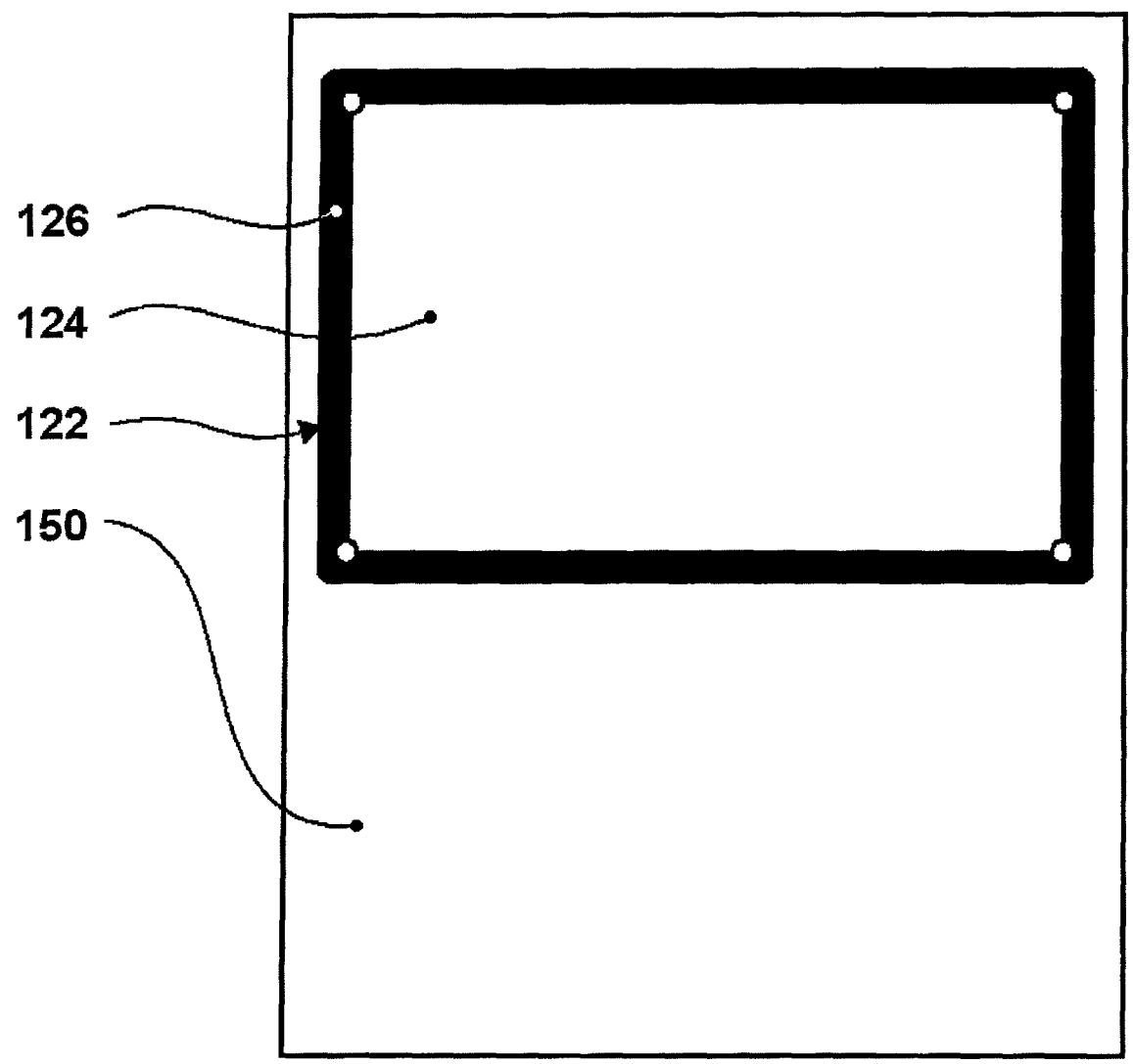
Figure 6A:
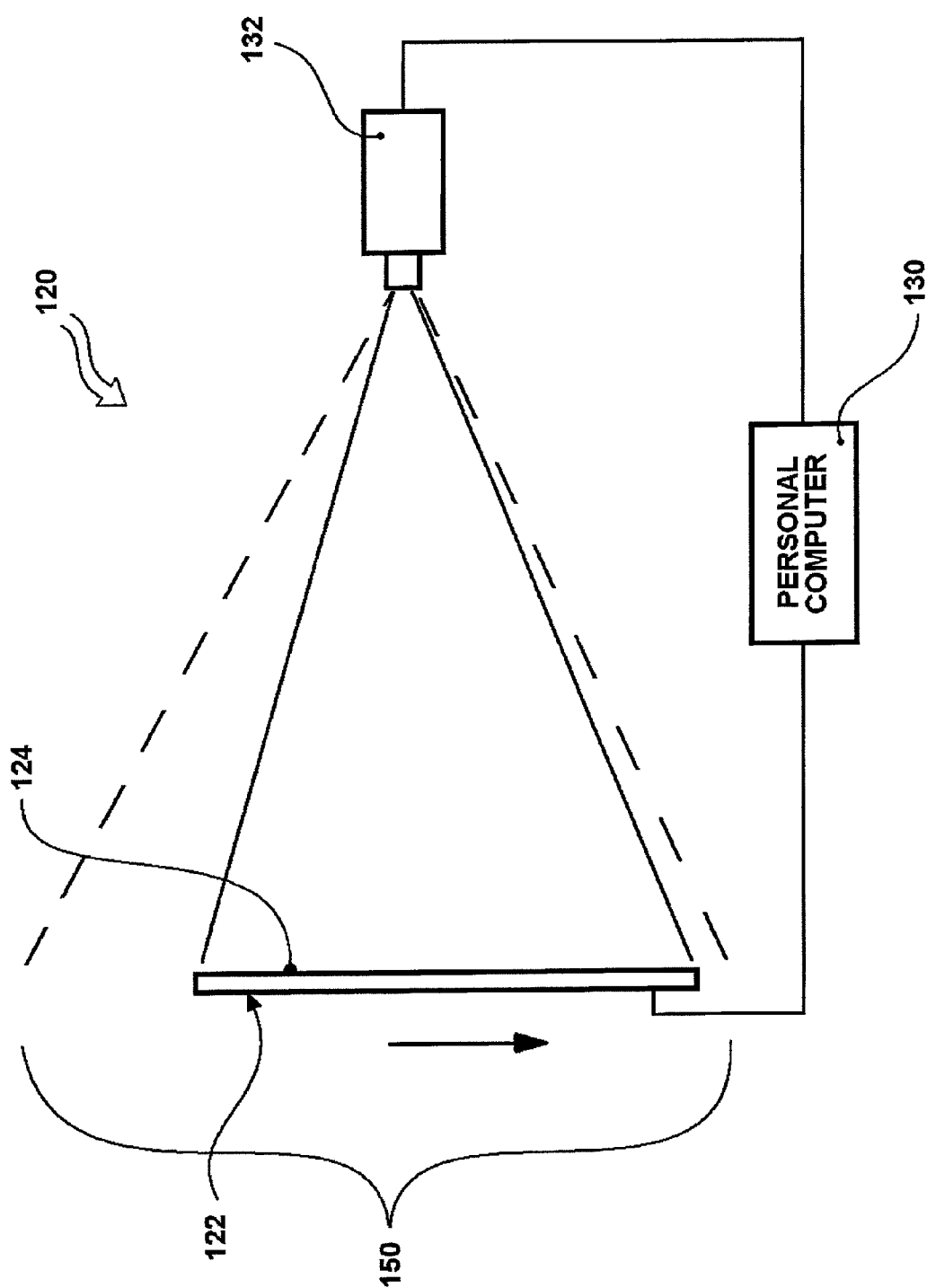
FIGS. 6a and 6b are side and front schematic illustrations respectively, of the interactive input/projection system of FIGS. 5a and 5b with the touch panel in a lower position.
Figure 6B:
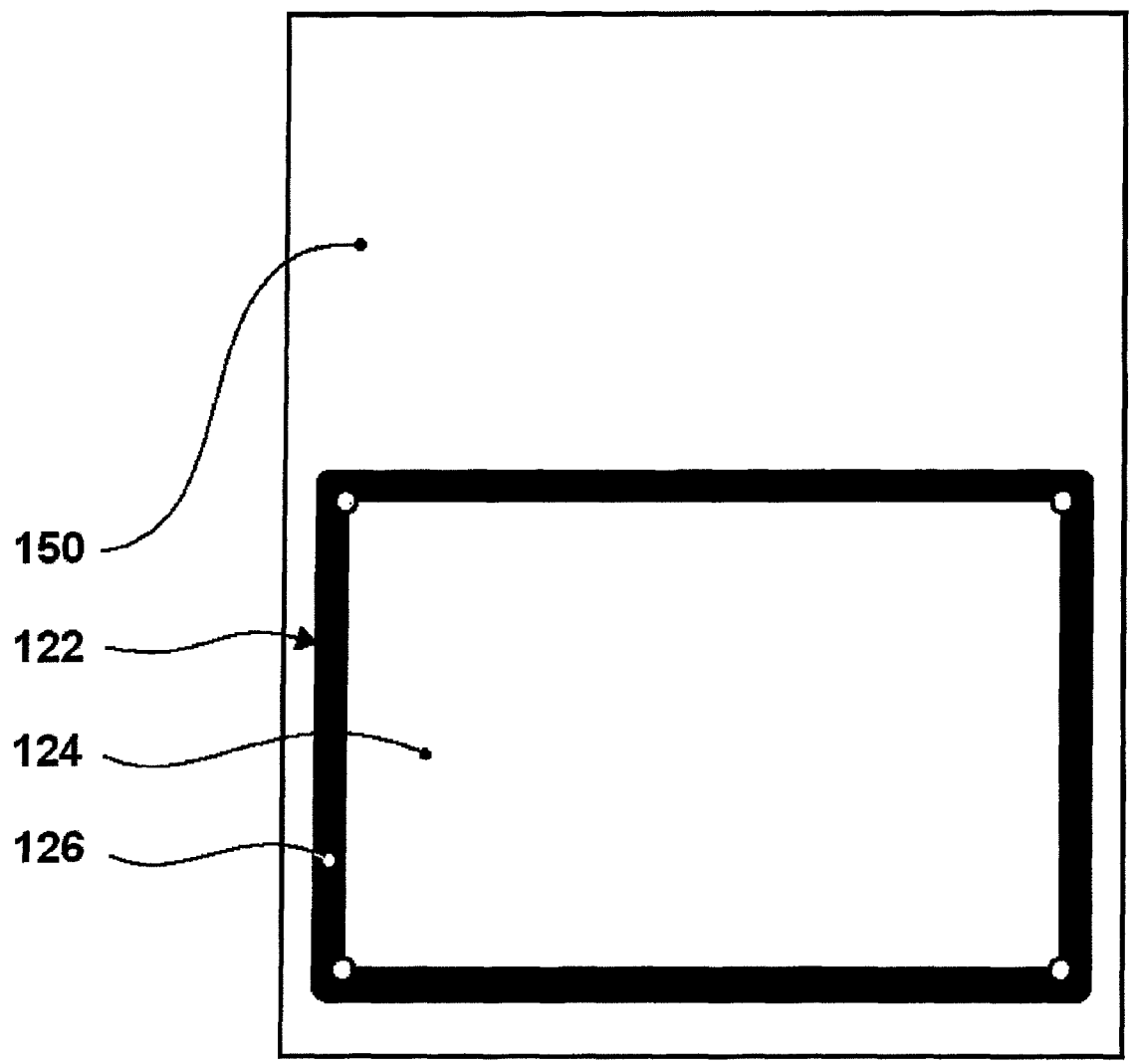

When the position of the touch panel 22 along the tracks 40 is altered, the mask 52 created by the personal computer 30 changes accordingly resulting in the projected image following and remaining aligned with the touch surface 24 of the touch panel 22. FIGS. 3 and 4 show the touch panel 22 in upper and lower positions respectively. In each case, the personal computer 30 creates the mask 52 to crop the projection zone 50 so that the projected image remains aligned with and corresponds to the touch surface 24 of the touch panel 22. As will be appreciated, in this manner the projected image follows the touch panel 22 irrespective of its position along the tracks 40 and without requiring realignment of the touch panel 22 and projector 32 each time the position of the touch panel 22 is adjusted.

Although the touch panel 22 is shown and described as being slidable along tracks 40 that are mounted on a wall surface or the like, those of skill in the art will appreciate that the touch panel 22 may be mounted on the wall surface using any suitable mechanical arrangement that permits the vertical and/or horizontal position of the touch panel 22 to be adjusted. Alternatively, the touch panel 22 may be mounted on a stand or other supporting structure that allows the vertical and/or horizontal position of the touch panel 22 to be adjusted.

Those of skill in the art will also appreciate that instead of IR LEDs 28, alternative markers may be used to allow the position of the touch panel 22 within the projection zone 50 to be determined. For example, other types of light sources or alternatively other radiation sources, such as for example radio frequency (RF) sources (eg. RF identification (RFID) tags), acoustic sources etc., that emit signals for processing to enable the position of the touch panel 22 within the projection zone 50 to be determined, may be used. In the case of RFID tags for example, at least two RFID tags may be employed at the boundaries of the touch panel 22 instead of the IR LEDs 28. The RFID tags respond to an energizing signal transmitted by an RFID reader (not shown) located in proximity to or within the projector 32. The responses from the RFID tags are processed by the personal computer 30 to determine the locations of the RFID tags and hence the position of the touch panel 22 within the projection zone 50 using triangulation techniques. The personal computer 30 in turn creates the mask 52 that used to crop the projection zone 50. If at least three RFID tags are used, where two RFID tags are placed at opposite corners of one segment of the bezel 26 and one RFID tag is placed near the center of the bezel segment that is opposite the one bezel segment, the planar orientation of the touch surface 24 can be determined from the signals output by the RFID tags. The planar orientation information can be used to correct for misalignment of the projector 32 with respect to the touch panel 22.

Alternatively, passive markers that reflect or otherwise return a broadcast signal to enable the position of the touch panel 22 within the projection zone 50 to be determined may be used. For example, the passive markers may comprise highly infrared (IR) reflective surfaces that reflect IR light projected on the touch surface 24 by the projector 32 to the camera device 44. Still alternatively, personal computer 30 can be used to process captured image frames to look for a large generally rectangular "white" region representing the touch surface 24 that is bordered by a darker region representing the bezel 26. In this case, the color of the bezel 26 can be selected to contrast distinctly with the color of the touch surface 24 as seen by the camera device 44.

Although the camera device 44 is described as a low resolution, low cost imaging device those of skill in the art will appreciate that a higher resolution imaging device may be used. If a higher-resolution imaging device is used, subsets of captured image frames that correspond to regions of particular interest can be processed to reduce computational overhead. If desired, the imaging device may comprise on-board processing to allow captured image frames to be processed to determine the location of the touch panel 22 within the projection zone 50. Also, a projection device with on-board processing can be employed to allow the projection device to calculate the mask 52 and resize the projected image.

Turning now to FIGS. 5a to 6b, an alternative interactive input/projection system is shown and is generally identified by reference numeral 120. The interactive input/projection system 120 comprises a touch panel 122 having a touch surface 124 surrounded by a bezel 126. The touch panel 122 is similar to that of the previous embodiment and communicates with a personal computer 130 that executes one or more application programs. The personal computer 130 provides video data output to a projector 132. The projector 132 in response to received video data from the personal computer 130, projects an image that is aligned with and sized to correspond to the touch surface 124.

In this embodiment, the projector 132 is a digital projector that has a widescreen fixed aspect ratio such as a 16:9 aspect ratio in a vertical orientation rather than in the usual horizontal orientation. As a result, the projection zone 150 of the projector 132 has a horizontal dimension corresponding generally to the horizontal dimension of the touch surface 124 and a vertical dimension that at least encompasses many and preferably all possible vertical positions of the touch panel 122. The projector 132 is conditioned to project an image in a sub-region of its projection zone 150 that corresponds to the position of the touch surface 124. As a result, the projected image fills the width of the projection zone 150 but not the height of the projection zone. When the position of the touch panel 122 is adjusted, the projector 132 is conditioned in response to user input, to shift the projected image in the vertical direction (either upwards or downwards) until the projected image corresponds to the location of the touch surface 124.

The projected image is aligned with and related to the touch surface 124 through an orientation procedure maps the computer display coordinate system to the touch surface coordinate system similar to the alignment methods disclosed in U.S. Pat. No. 7,355,593 to Douglas B. Hill et al. assigned to SMART Technologies ULC of Calgary, Alberta, Canada, the content of which is incorporated herein by reference. Because of this coordinates system mapping, the relationship between the computer display coordinate system and the touch surface coordinate system is never lost during movement of the touch panel 122.

Turning now to FIGS. 7a to 7d, another embodiment of an interactive input/projection system is shown and is generally identified by reference numeral 220. Similar to the previous embodiment, the interactive input/projection system 220 comprises a touch panel 222 having a touch surface 224. The touch panel 222 is mounted on a wall surface or the like and communicates with a personal computer 230 that executes one or more application programs. The personal computer 230 provides video data output to a projector 232 oriented in a portrait format. The projector 232, in response to received video data from the personal computer 230, projects an image that is presented on the touch surface 224.

A track 260 is mounted on the wall surface to one side of the touch panel 222. Upper and lower sliders 262 and 264 respectively are mounted on the track 260. The lower slider 264 has a switch (not shown) thereon moveable between on and off conditions. Proximity sensors (not shown) are mounted at spaced locations along the track 260 to allow the positions of the sliders 262 and 264 to be detected. The proximity sensors and lower slider 264 communicate with the personal computer 230.

During operation, when the projector 232 is in a fixed aspect ratio mode, the personal computer 230 in response to the output of the proximity sensors uses the positions of the sliders 262 and 264 to mask the video image data output to the projector 232 so that the image projected by the projector is positioned on the touch surface 224 at the desired location. In the fixed aspect ratio mode, the personal computer 230 modifies the video image data output to the projector 232 so that the projected image fills the width of the touch surface 224 but not the height of the touch surface. When the switch on the lower slider 264 is in the on condition, the personal computer 230 uses the position of the lower slider 264 along the track 260 to position the bottom of the projected image on the touch surface 224. When the position of the lower slider 264 along the track 260 is changed, the personal computer 230 modifies the video image data output to the projector 232 in response to proximity sensor output so that the position of the projected image on the touch surface 224 follows the lower slider 264.

Figure 7A:
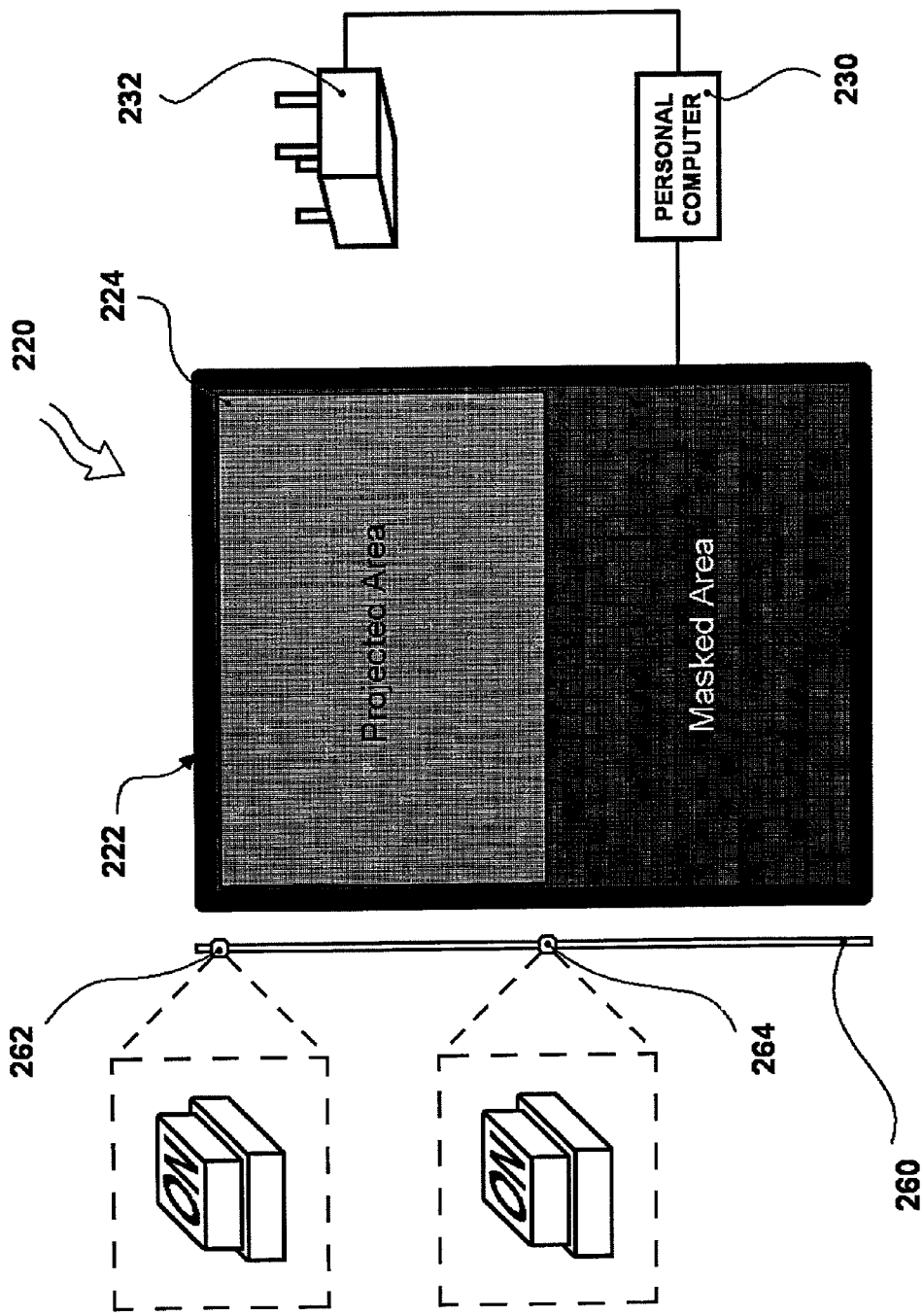
Figure 7B:
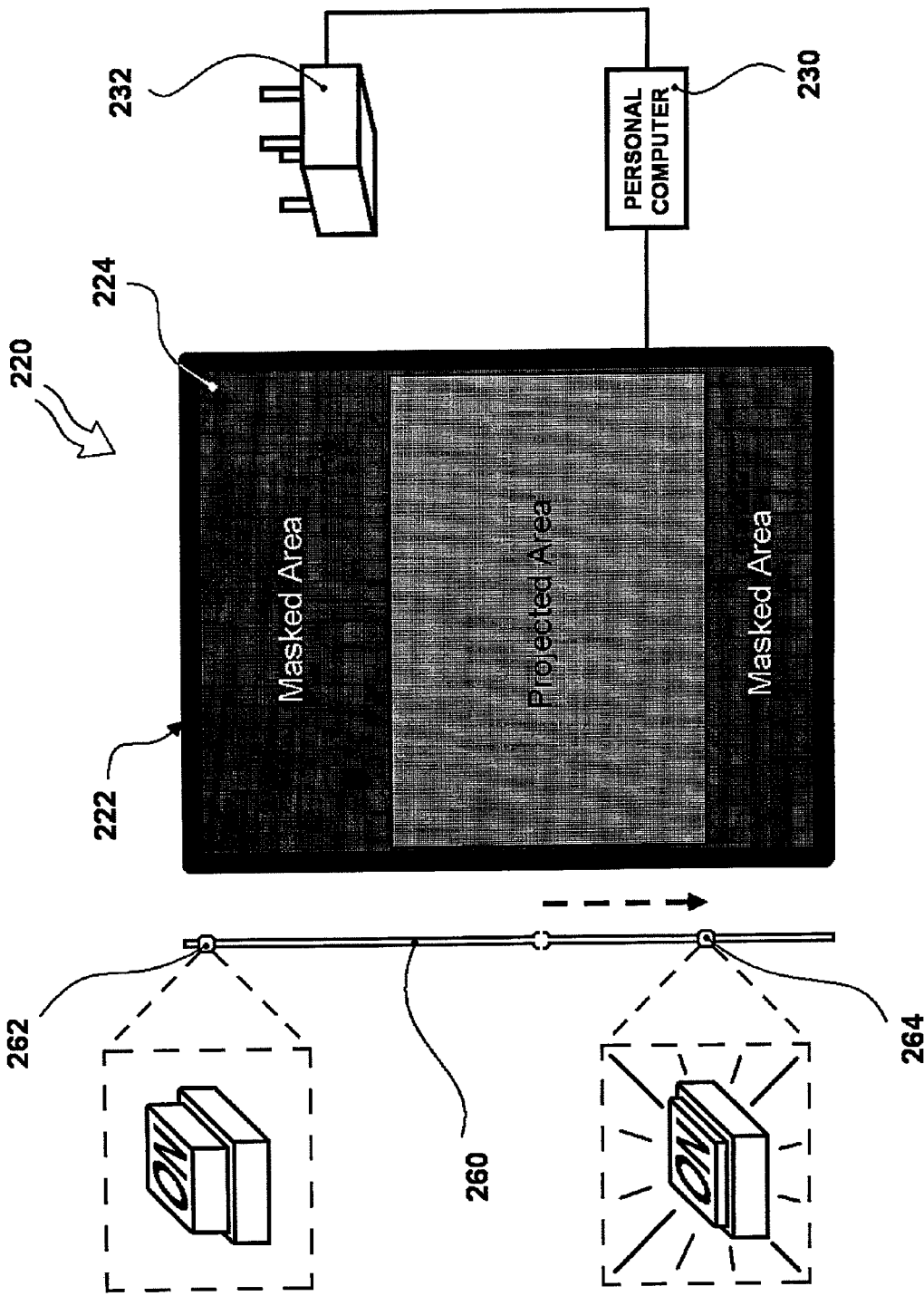

For example, FIG. 7a shows the lower slider 264 in the on condition so that the position of the lower slider 264 along the track 260 establishes the position of the bottom of the projected image on the touch surface 224. FIG. 7b shows the lower slider 264 after having been moved to a lower position along the track 260. In this case, the projected image is repositioned on the touch surface 224 so that the bottom of the projected image remains in alignment with the lower slider 264.

When the switch on the lower slider 264 is in the off condition, the personal computer 230 uses the position of the upper slider 262 along the track 260 to position the top of the projected image on the touch surface 229. When the position of the upper slider 262 along the track 260 is changed, the personal computer 230 modifies the video image data output to the projector 232 in response to proximity sensor output so that the position of the projected image on the touch surface 224 follows the upper slider 262. FIG. 7c shows the upper slider 262 after having been moved from the top of the track 260 to a lower position along the track. In this case, the projected image is repositioned on the touch surface 224 from that of FIG. 7a to a new position so that the top of the projected image remains in alignment with the upper slider 262.

Figure 7D:
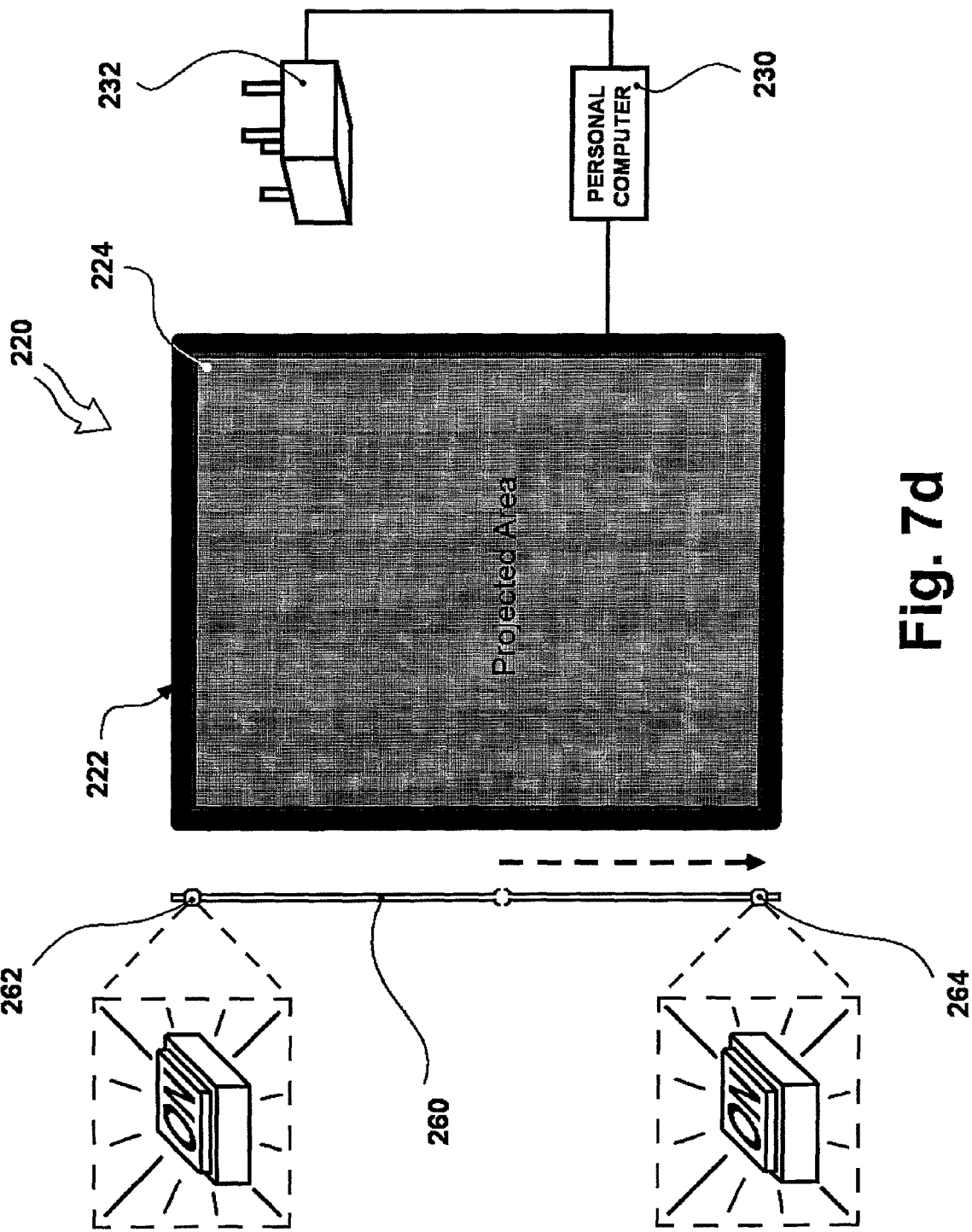

When the projector 232 is in a variable aspect ratio mode, the positions of both the upper and lower sliders 262 and 264 along the track 260 are used to set the positions of the top and bottom of the projected image on the touch surface 224 irrespective of the condition of the switch on the lower slider 264. When the upper slider 262 is at the top of the track 260 and the lower slider 264 is at the bottom of the track 260 as shown in FIG. 7d, the projection zone is not masked so that the projected image fills the entire touch surface 224. If the upper and/or lower sliders are moved along the track 260, the personal computer 230 modifies the video image data output to the projector 232 in response to proximity sensor output so that the bottom of the projected image remains in alignment with the lower slider 264 and so that the top of the projected image remains in alignment with the upper slider 262.

Although the lower slider 264 is described as having the switch, those of skill in the art will appreciate that the switch may be placed on the upper slider 262. Alternatively, both sliders 262 and 264 may carry switches. In this case, one slider is given priority to resolve conflicting slider switch positions. One or more of the sliders 262 and 264 may also carry a switch to allow the aspect ratio mode of the projector 232 to be controlled. Alternatively, the sliders may be of the type used in commercially available sound boards. This type of slider would not require the user to activate a switch prior to moving the slider. In this case, the last slider to be moved determines the position of the projected image on the touch surface 224. Rather than using multiple sliders, a single slider may be used to adjust the position of the center of a fixed-size projection area. Alternatively or in combination, horizontally adjustable sliders may be used to control the horizontal projection dimension.

If machine vision technology is employed to detect pointer interaction with the touch surface 224, one or more of the sliders 262 and 264 may carry an imaging device such as a camera that is oriented to look generally across the touch surface 224. In this case, as the sliders are moved along the track 260, the imaging devices are positioned so that their fields of view remain proximate to the projected image. Alternatively, a generally horizontal bar carrying laterally spaced imaging devices may extend from the slider over the touch surface 224. The imaging devices in this case are oriented so that they look generally across the touch surface. When the slider is moved, the bar moves with the slider to maintain the position of the imaging devices proximate to the projected image.

Turning now to FIG. 7e, an alternative track design is shown. In this embodiment, the track 260 comprises a pair of wire loops 270. Each wire loop 270 is wound around a lower pulley 272 and an upper rotary encoder 272. The rotary encoders 272 provide digital output to the personal computer 230. Upper slider 262 is affixed to one of the wire loops 270 and lower slider 264 is affixed to the other wire loop 270. When one of the sliders 262, 264 is moved, the wire loop 270 attached to the moving slider causes the rotary encoder 272 to rotate as the wire loop moves with the slider. Rotation of the rotary encoder 272 results in digital output being conveyed to the personal computer 230 allowing the position of the slider to be tracked. The position of the slider can then be used to adjust the video image data output to the projector 232 as described above.

Figure 7F:
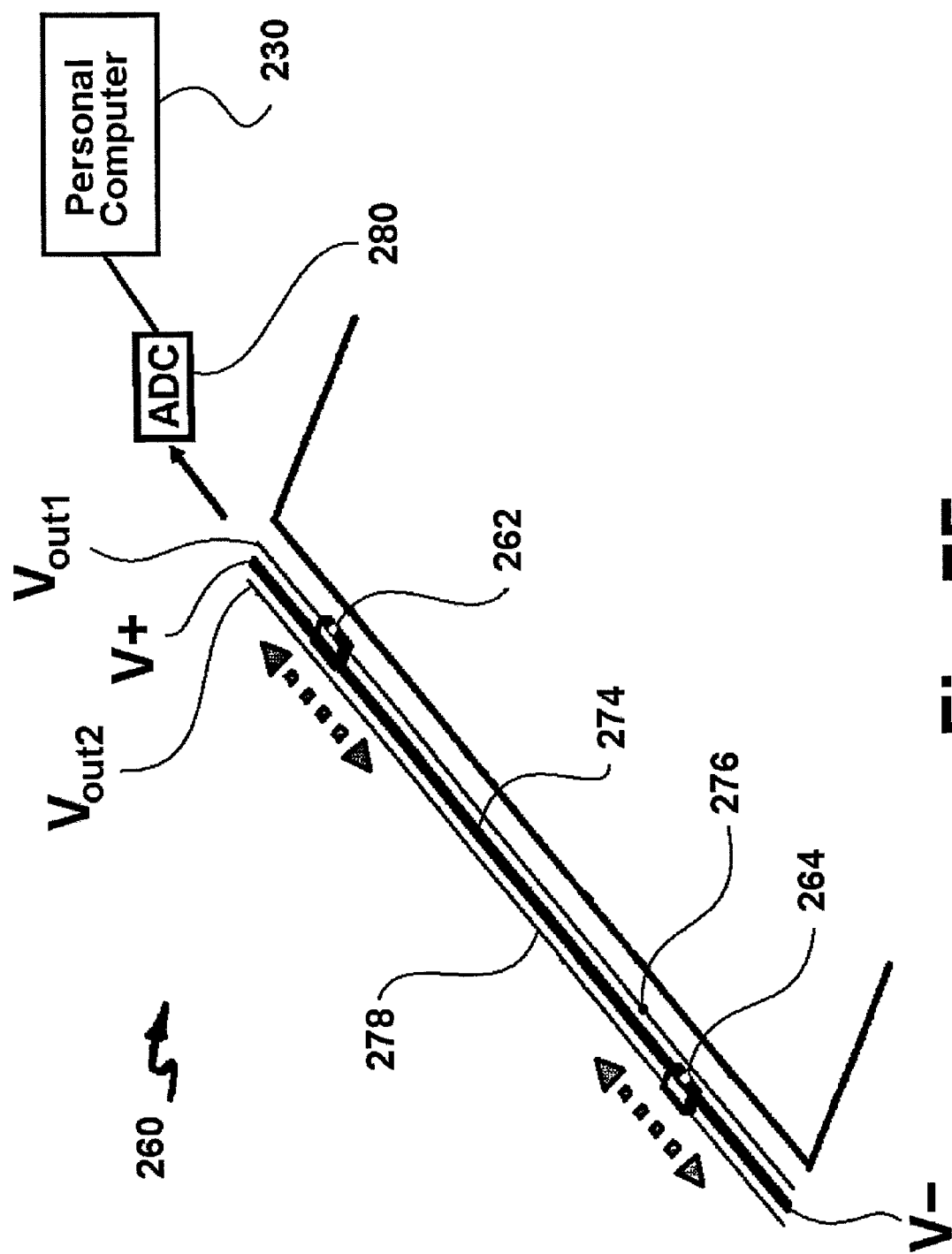

Another alternative track design is shown in FIG. 7f. In this embodiment, the track 260 and sliders 262 and 264 are implemented as a dual output sliding potentiometer. A longitudinally extending resistive trace 274 made of carbon or other suitable resistive material is disposed in the center of the track 260. Conductive output traces 276 and 278 run adjacent opposite sides of the resistive trace 274. Upper slider 262 contacts the resistive trace 274 the conductive output trace 276, providing a conductive electrical connection between resistive trace 274 and conductive output trace 276. Likewise, lower slider 264 contacts the resistive trace 274 and the conductive output trace 278 providing a conductive electrical connection between resistive trace 274 and conductive output trace 278. A voltage V+ is applied to one end of the resistive trace 274 and a voltage V− is applied to the other end of the resistive trace 274. The track 260 thus acts as a voltage divider in that voltage, Vout1, measured from the conductive output trace 276 is proportional to the position of the slider 262 along the track 260. Voltage, Vout2, measured from the conductive output trace 278 is proportional to the position of slider 264 along the track. Voltages Vout1 and Vout2 are output to an analog-to-digital converter 280. The digital outputs of the analog-to-digital converter 280 are conveyed to the personal computer 230 allowing the positions of the sliders 262 and 264 to be tracked. The positions of the sliders can then be used to adjust the video image data output to the projector 232 as described above.

Figure 7G:
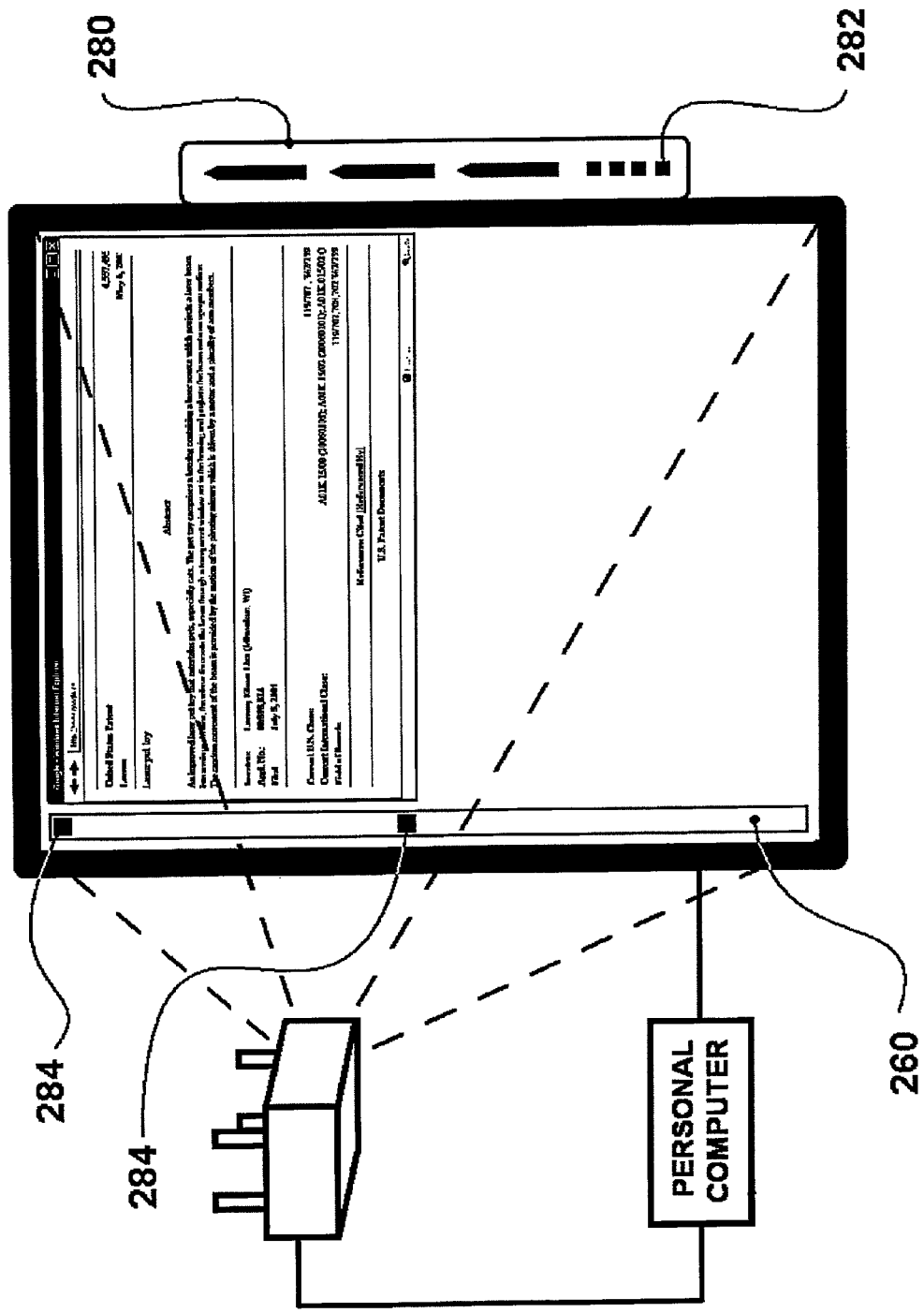
FIG. 7g is an illustration of a software track for the interactive input/projection system of FIGS. 7a to 7d.

Yet another embodiment of a track design is shown in FIG. 7g. In this embodiment, the track 260 is implemented in software and appears to one side of the displayed image when a button 282 located on a pointer or utility tray 280 is pressed. In this case, the portion of the projection zone 50 in which the track 260 appears is not masked so that the track 260 extends along the entire side of the projection zone. Upper and lower graphical sliders 284 are displayed on the track 260. User interactions with the upper and lower sliders 284 allows the positions of the top and bottom of the projected image on the touch surface to be set.

Figure 8A:
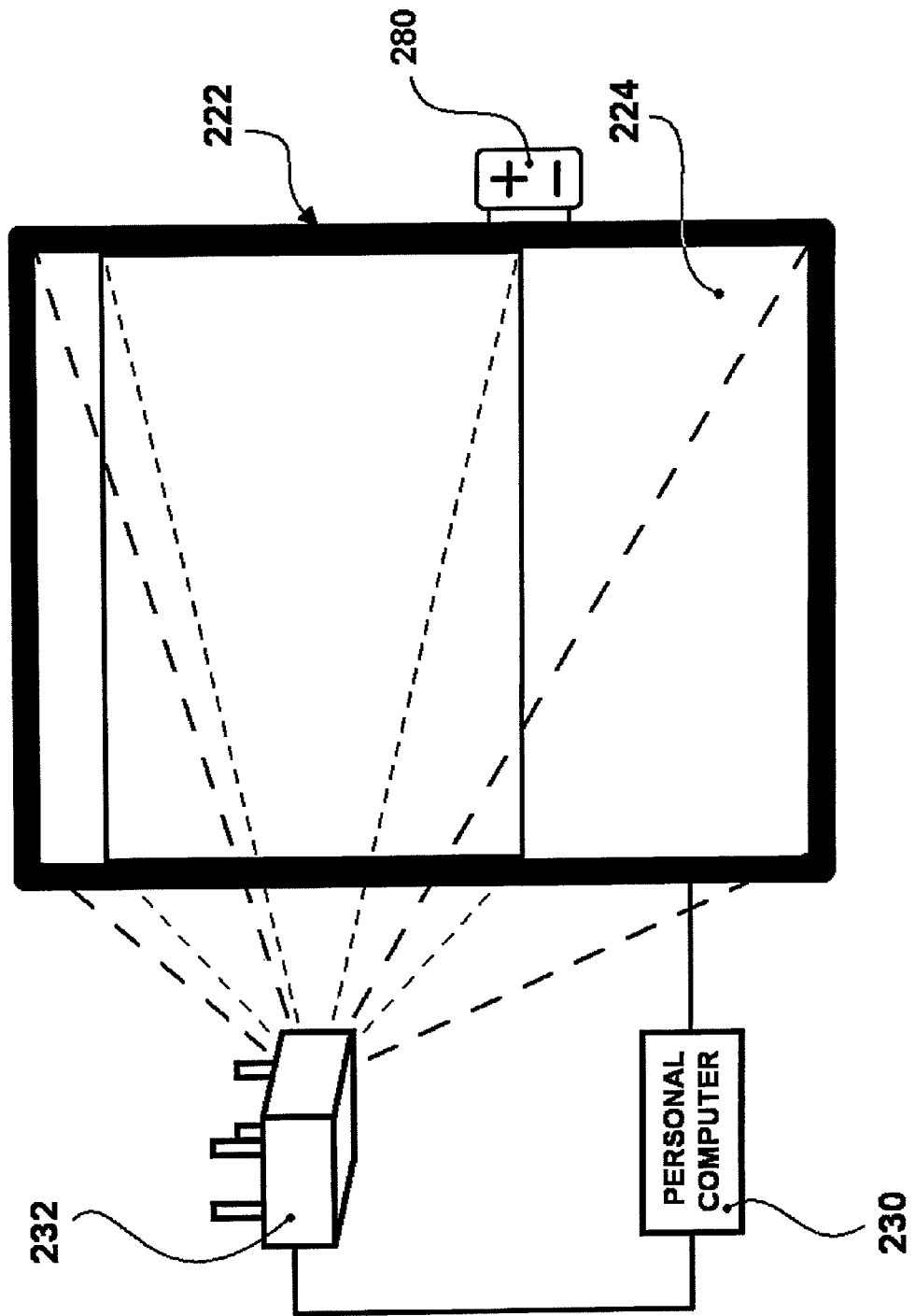
FIG. 8a to 8d are schematic illustrations of yet another interactive input/projection system.

If desired, rather than using a track and sliders, the touch panel 222 may carry on-board controls 280 to allow the position of the projected image on the touch surface 224 to be adjusted as shown in FIG. 8a. When a user interacts with the on-board controls 280, the touch panel 222 provides output to the personal computer 230. The personal computer 230 in turn modifies the video image data output to the projector 232 so that the projected image is shifted vertically in the desired direction.

Figure 8B:
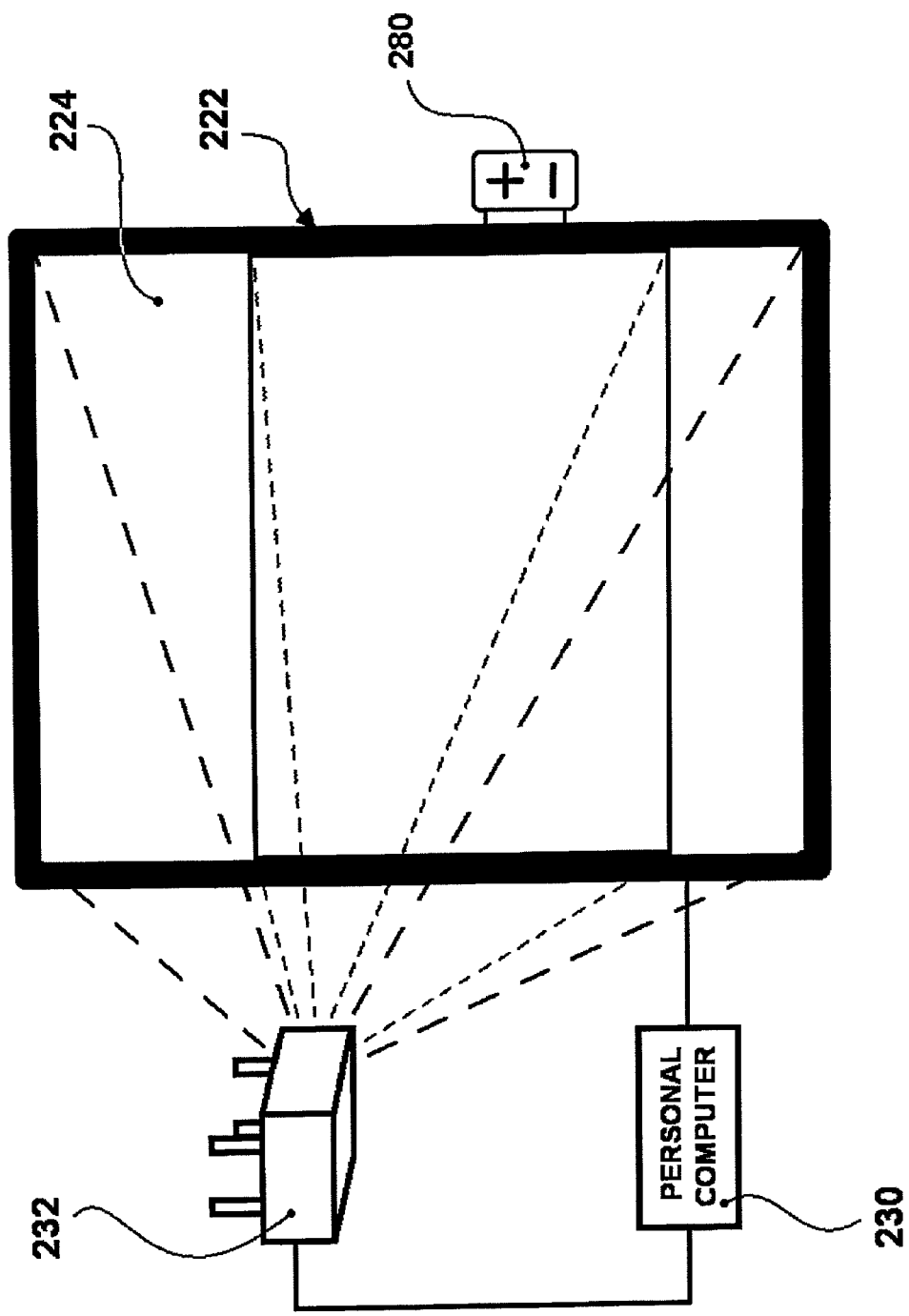
Figure 8C:
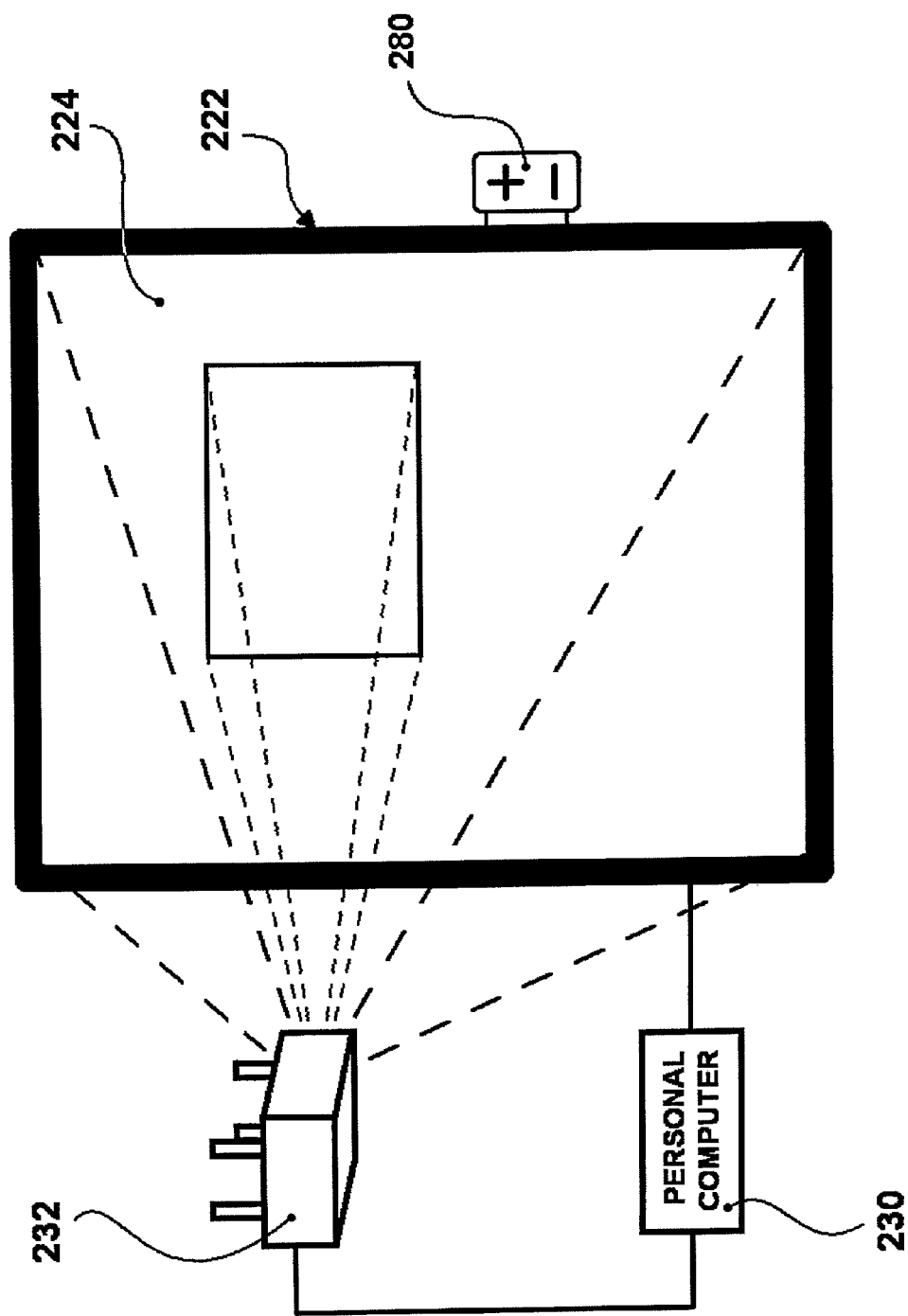
Figure 8D:
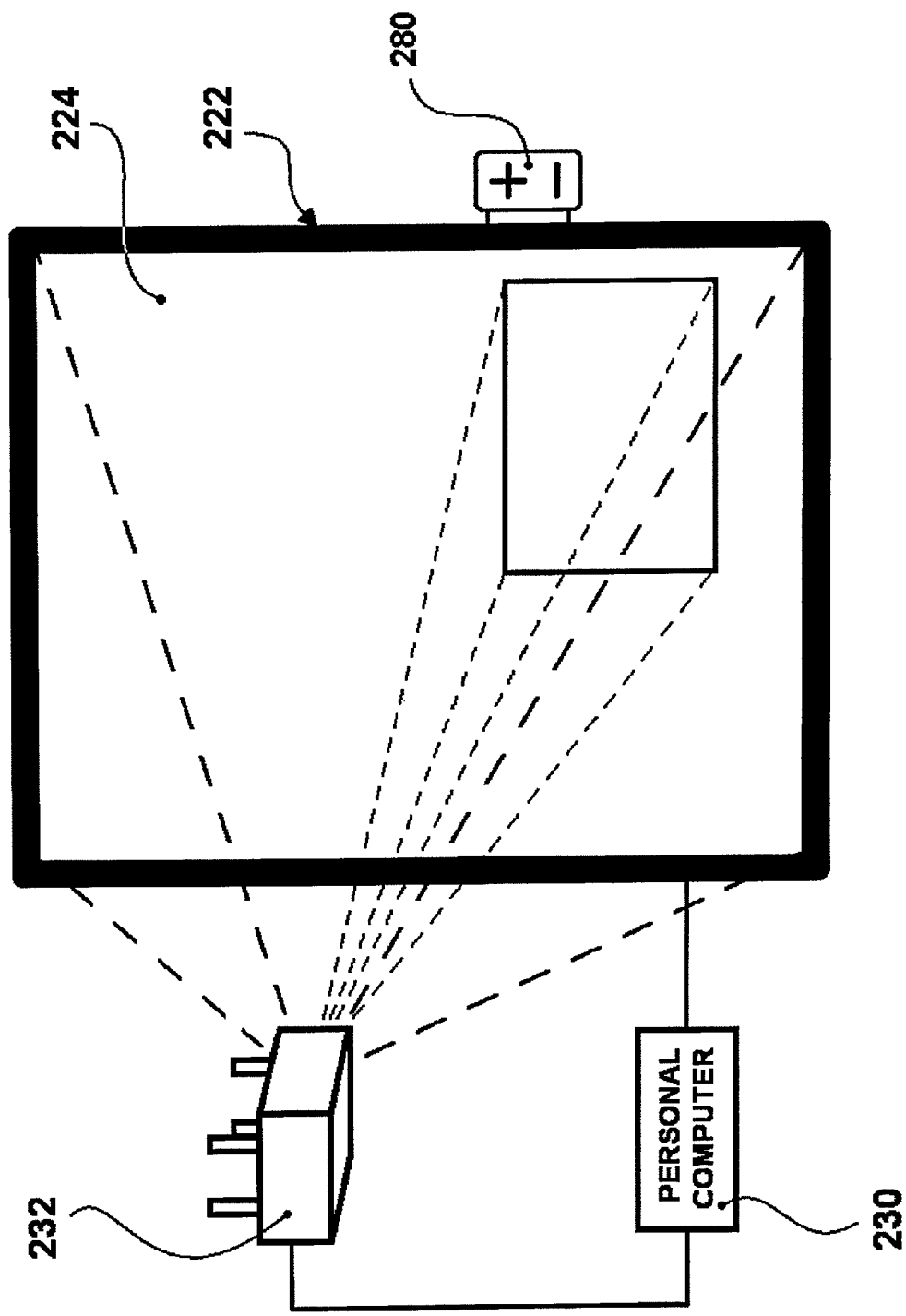

FIGS. 8a and 8b show adjustment of the projected image along the touch surface 224 in a downward direction in response to user interaction with the on-board controls 280 when the projector 232 is in the fixed aspect ratio mode. FIGS. 8c and 8d show adjustment of the projected image on the touch surface 224 in response to user interaction with the on-board controls 280 when the projector 232 is in the variable aspect ratio mode.

Figure 9A:
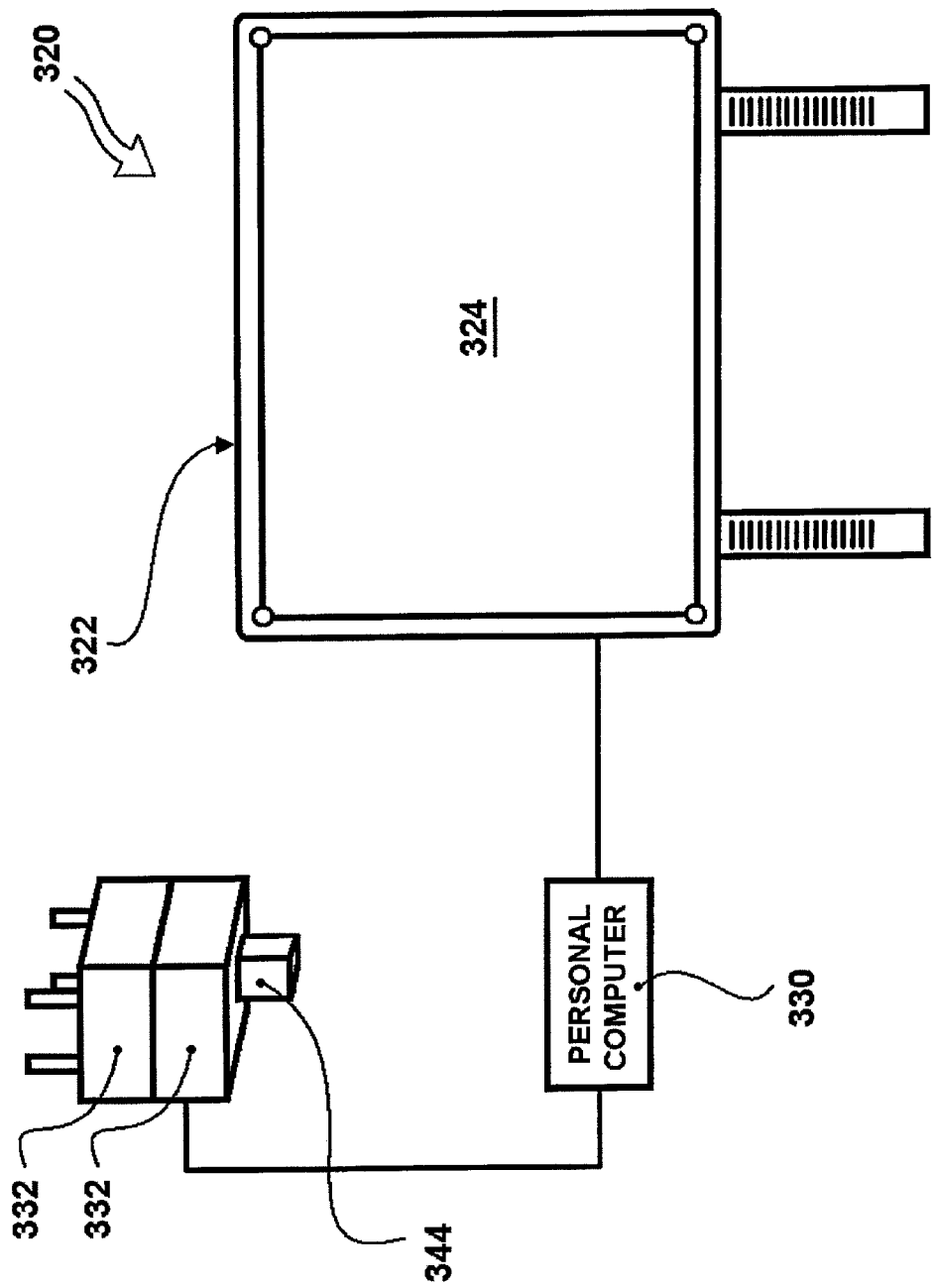

Turning now to FIGS. 9a and 9b, yet another embodiment of an interactive input/projection system is shown and is generally identified by reference numeral 320. The interactive input/projection system 320 comprises a large touch panel 322 having a touch surface 324. The touch panel 322 communicates with a personal computer 330 that executes one or more application programs. The personal computer 330 provides video data output to a pair of stacked projectors 332. The projectors 332 in response to received video data from the personal computer 330 project an image onto a portion of the touch surface 324. Some of the pixels 370 of the projected image are exclusively from the top projector 332 in the stack, some of the pixels 372 of the projected image are exclusively from the bottom projector 332 in the stack and some of the pixels 374 of the projected image are blended from both projectors 332. A camera device 344 is positioned adjacent the projectors 332 and communicates with the personal computer 330. The camera device 344 is oriented so that its field of view at least encompasses the touch surface 324.

The personal computer 330 processes image frames captured by the camera device 344 to detect the existence and position of a user in front of the touch surface 324 in a manner similar to that described in U.S. patent application Ser. No. 11/420,146 to Morrison et al., assigned to SMART Technologies ULC, the content of which is incorporated herein by reference. Based on the detected position of the user, the personal computer 330 modifies the video image data output to the projectors 332 so that the position of the projected image presented on the touch surface 324 is at an ergonomically acceptable location thereby to facilitate user interaction with the projected image.

Although the interactive touch system 320 is described as comprising two stacked projectors 332 and a single camera device 344, depending on the height and width of the touch surface 324, a larger matrix of projectors 332 or a very high resolution projector, and additional camera devices 344 may be employed. In this case, as a user moves relative to the touch panel 322, the position of the user can be tracked and video image data provided to the projectors 332 operated so that the projected image presented on the touch surface 324 follows the user and remains at an ergonomically acceptable location.

Figure 10A:
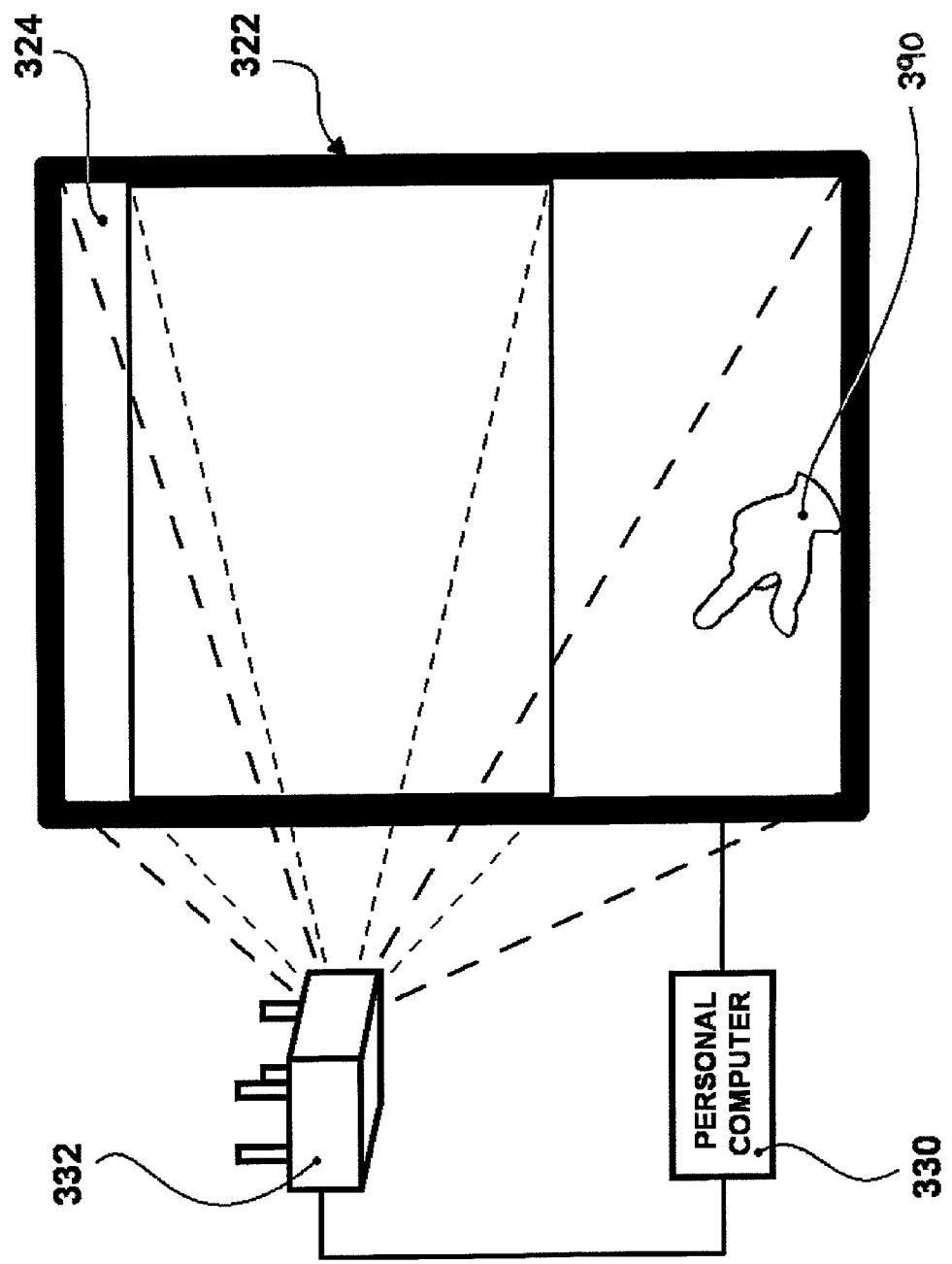
FIGS. 10a to 10g show adjustment of a projected image on a touch surface.
Figure 10B:
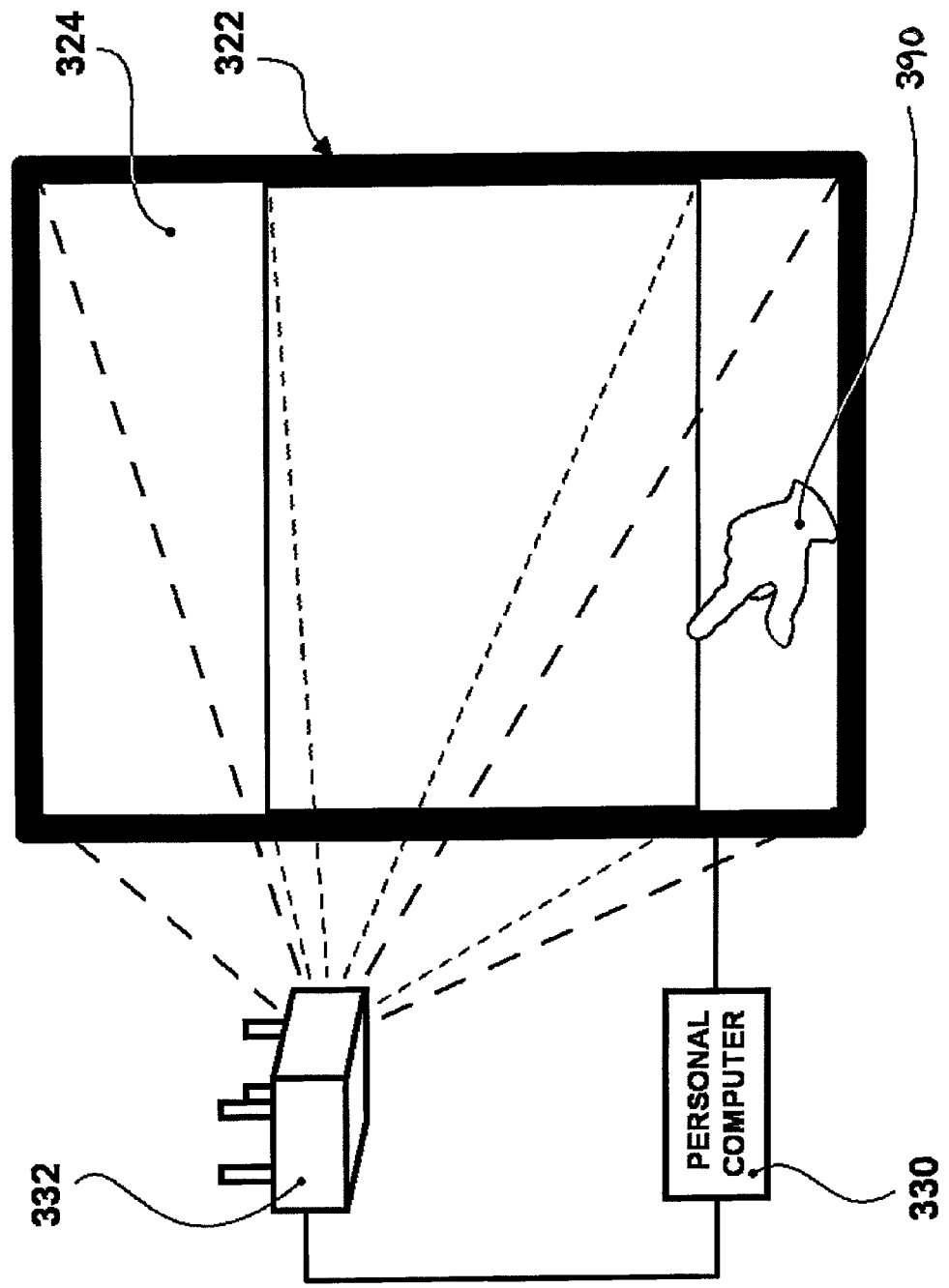

In an alternative embodiment, rather than processing image frames to detect the position of a user relative to the touch panel 322, the personal computer 330 can be conditioned to interpret touch input on the touch surface 324 that is outside of the projected image as an instruction to move the projected image. For example, if the touch surface 324 has a vertical dimension exceeding the vertical dimension of the projected image, when touch input 390 is made on the touch surface 324 below the projected image as shown in FIG. 10a, the personal computer 330, in response to the touch input 326, modifies the video image data output to the projector 332 so that the bottom of the projected image moves to a location on the touch surface 324 corresponding to the touch location as shown in FIG. 10b. Although not shown, if touch input 390 is made on the touch surface 324 above the projected image, the personal computer 330 modifies the video image data output to the projector 332 so that the top of the projected image moves to a location on the touch surface 324 corresponding to the touch location. If the touch surface 324 has a horizontal dimension exceeding the horizontal dimension of the projected image, when touch input is made of the touch surface 324 to one side of the projected image, the personal computer 330, in response to the input, modifies the video image data output to the projector 332 so that the side of the projected image moves to a location on the touch surface 324 corresponding to the touch location.

Figure 10C:
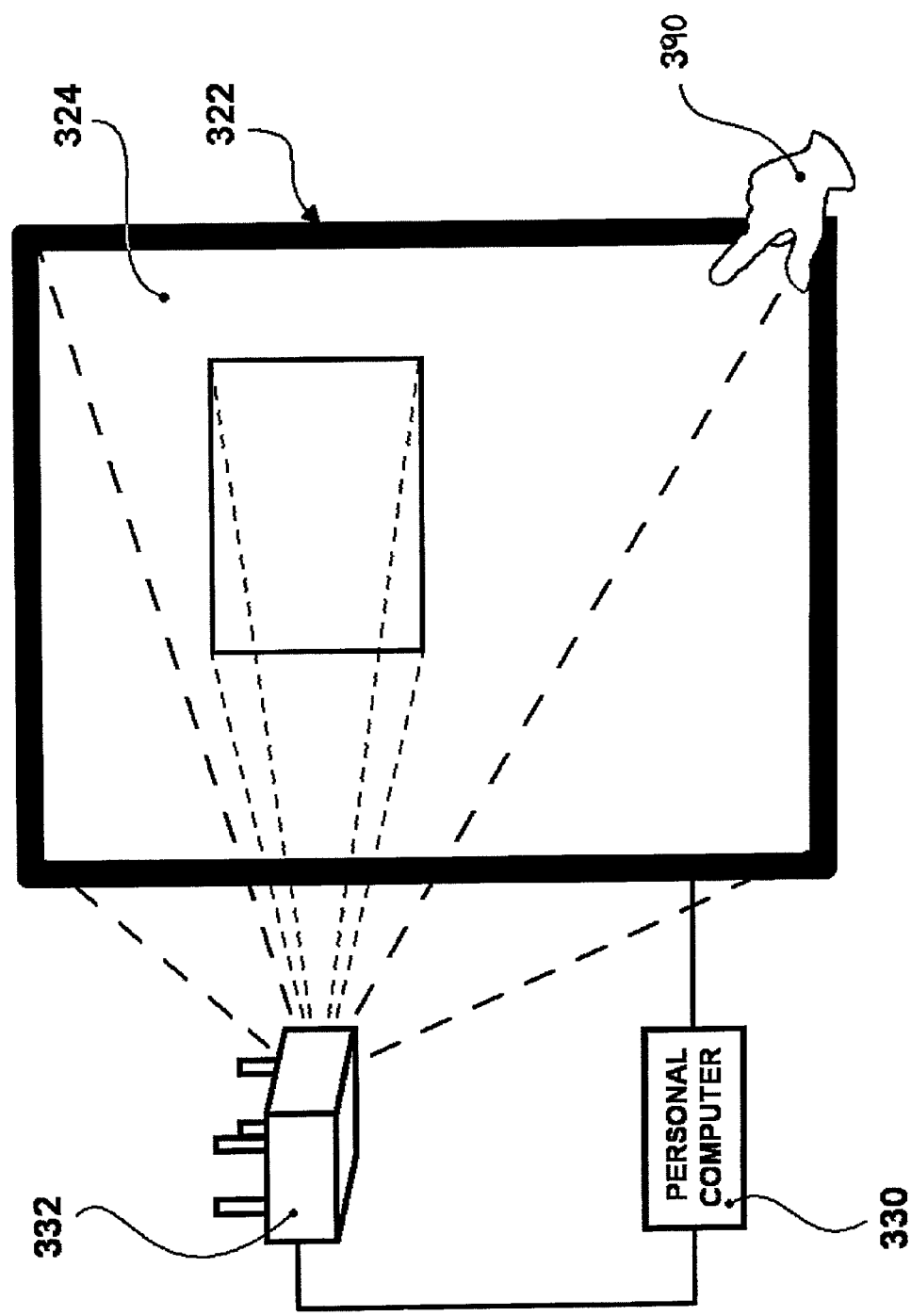
Figure 10D:
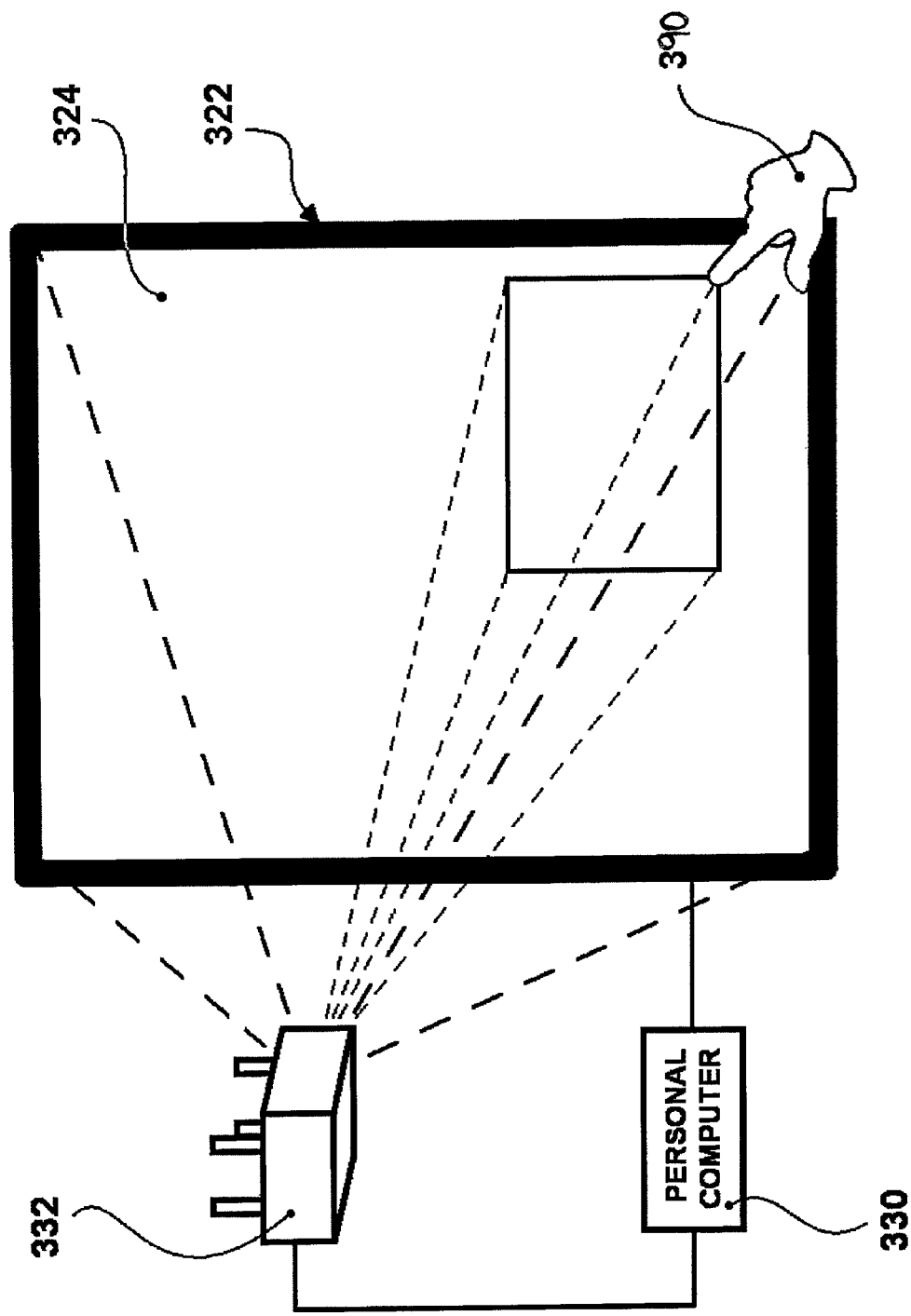

When the touch surface 324 has horizontal and vertical dimensions that exceed the dimensions of the projected image as is the case with a touch "wall", when touch input 390 is made on the touch surface 324 at a location outside of the projected image, the personal computer 330, in response to the touch input, modifies the video image data output to the projector 332 so that the corner of the projected image that was closest to the touch location is moved to a location corresponding to the touch location as shown in FIGS. 10c and 10d.

Figure 10E:
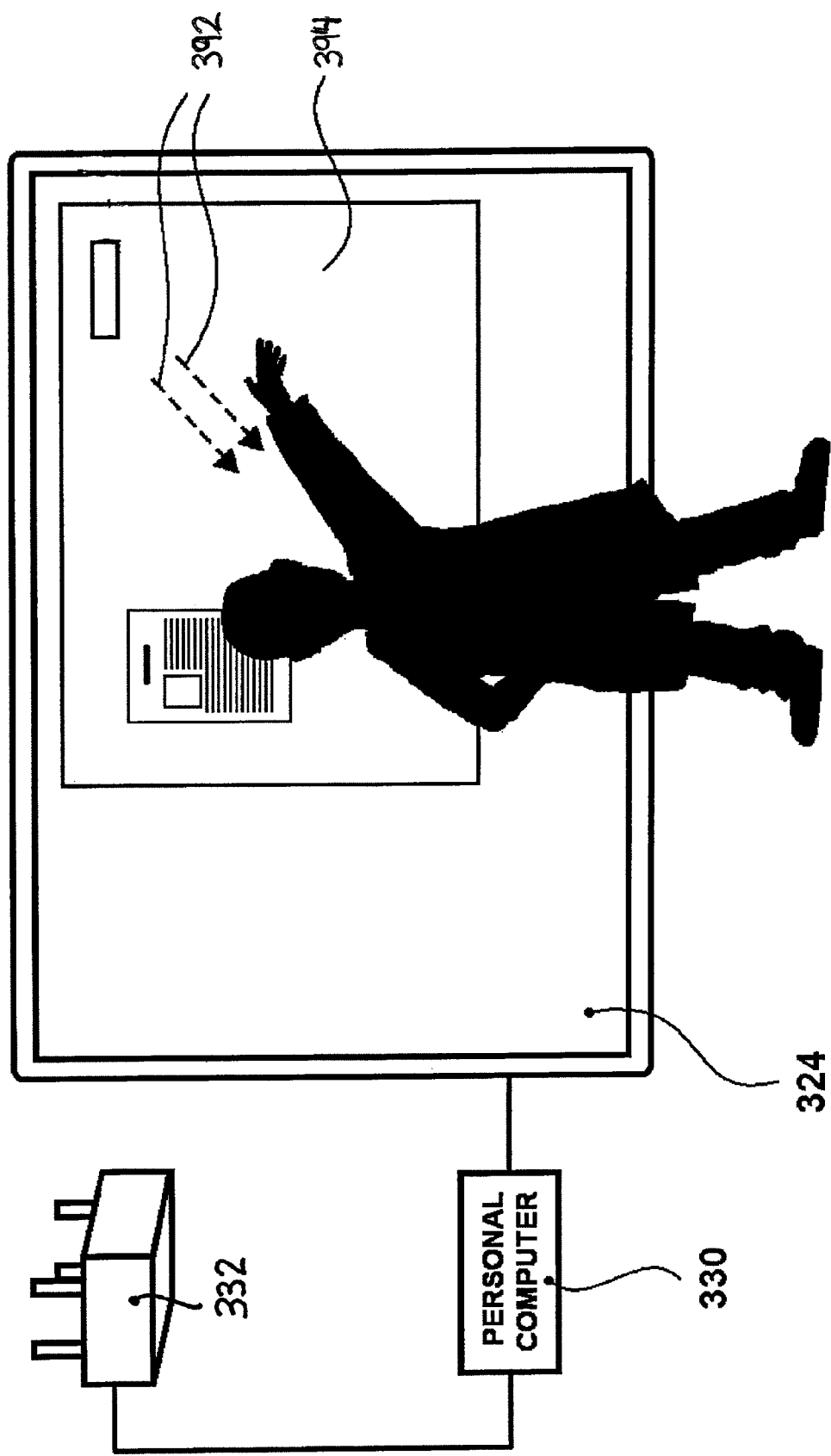
Figure 10F:
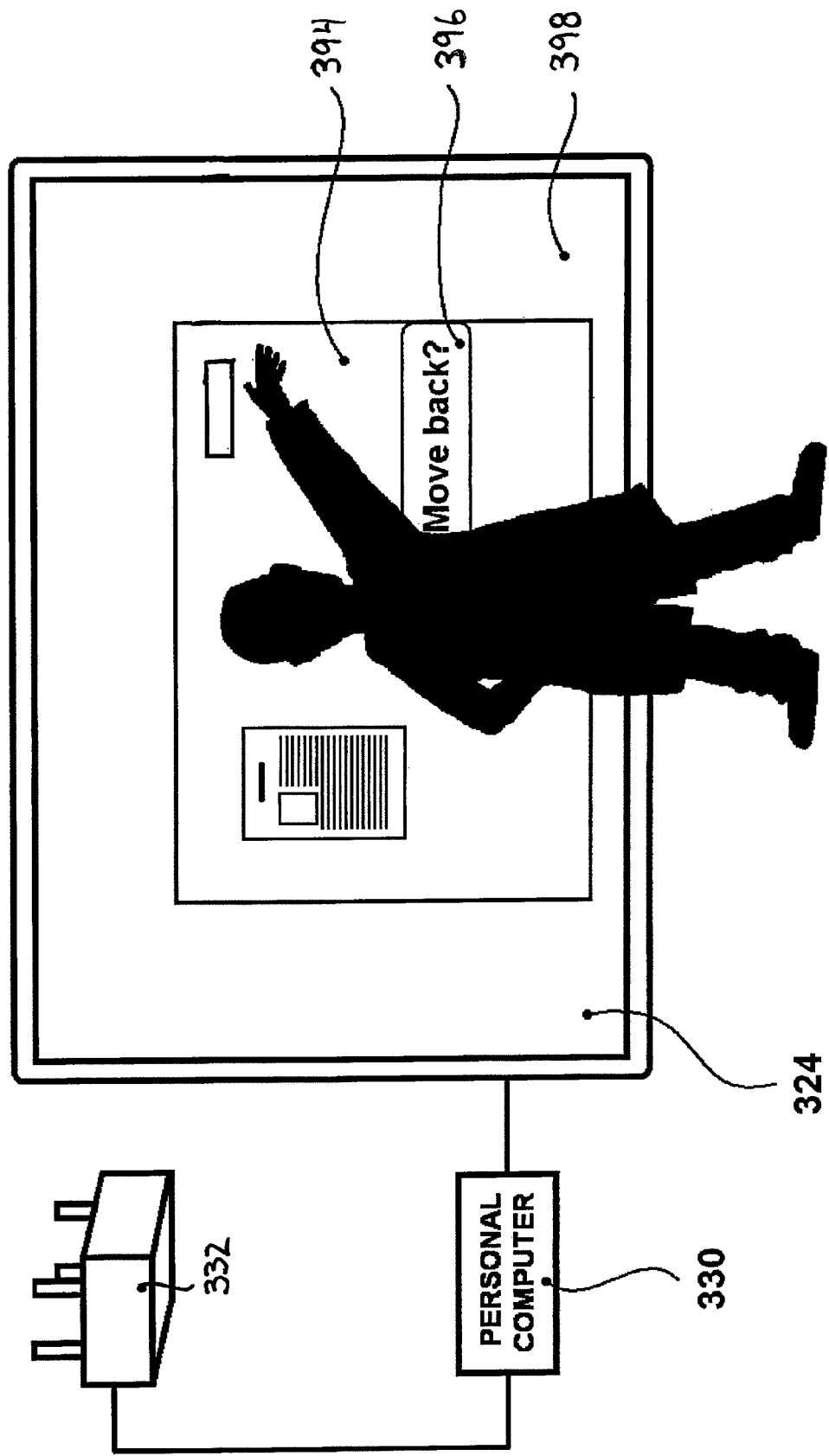
Figure 10G:
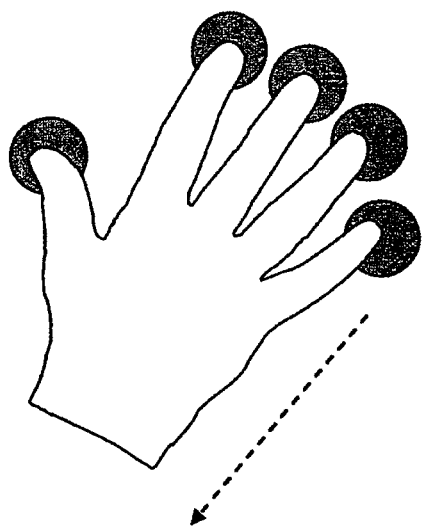
Figure 10G:
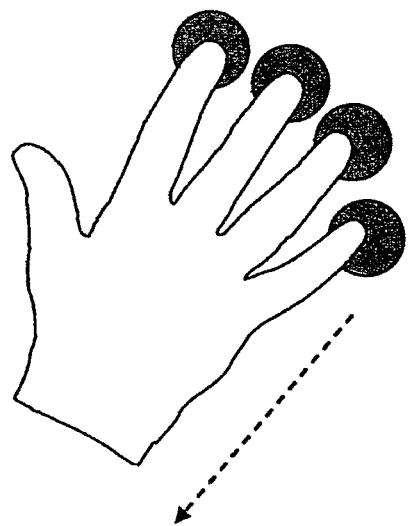

The personal computer 330 can also be conditioned to interpret gestures that may be used as instruction to move the projected image as shown in FIGS. 10e to 10g. In FIG. 10e, when a user wishes to move the projected image, the user inputs a move gesture, in this example by drawing two generally parallel, closely spaced lines 392 in succession, on the touch surface 324. When the personal computer 320 receives the touch input generated in response to the move gesture and recognizes the input as the move gesture, the personal computer 330 awaits further touch input. When the further touch input is received, the personal computer 330 moves projected image 394 temporarily to the location of the further touch input. The user can then interact with the projected image 394 at its new position. As seen in FIG. 10f, the user can then return the projected image to its original position through a user toggle 396, which appears on the projected image once the projected image 394 has been temporarily relocated. Alternatively, the projected image may return to its original position after a period of inactivity. Rather than using a black or grey mask, in this embodiment, the area of the touch surface 324 that remains 398 when the projected image 394 is moved, is masked with a background color or pattern different to that of the projected image 334 making it easy for the user to distinguish the edges of the projected image 334.

In another example, grasp-and-move gestures as shown in FIG. 10g may be used to move the location of the projected image. Those of skill in the art will understand that virtually any gesture or touch input may be used to initiate movement of the projected image and such gestures or touch inputs may be defined by the application program or operating system or they may be defined by the user.

In yet another embodiment, the position of the projected image on the touch surface 324 is determined during calibration. A user may enter a calibration mode via selection of a mechanical button on the touch panel 322 or a software button or menu displayed on the touch surface 324. During calibration, the user is prompted to touch the highest point on the touch surface 324 of the touch panel 322 that they can comfortably reach. This vertical position is then used to establish the top of the projected image. For example, the top of the projected image can be aligned with the vertical position or set below the vertical position at a location deemed to be ergonomically optimal for the user.

Figure 11:
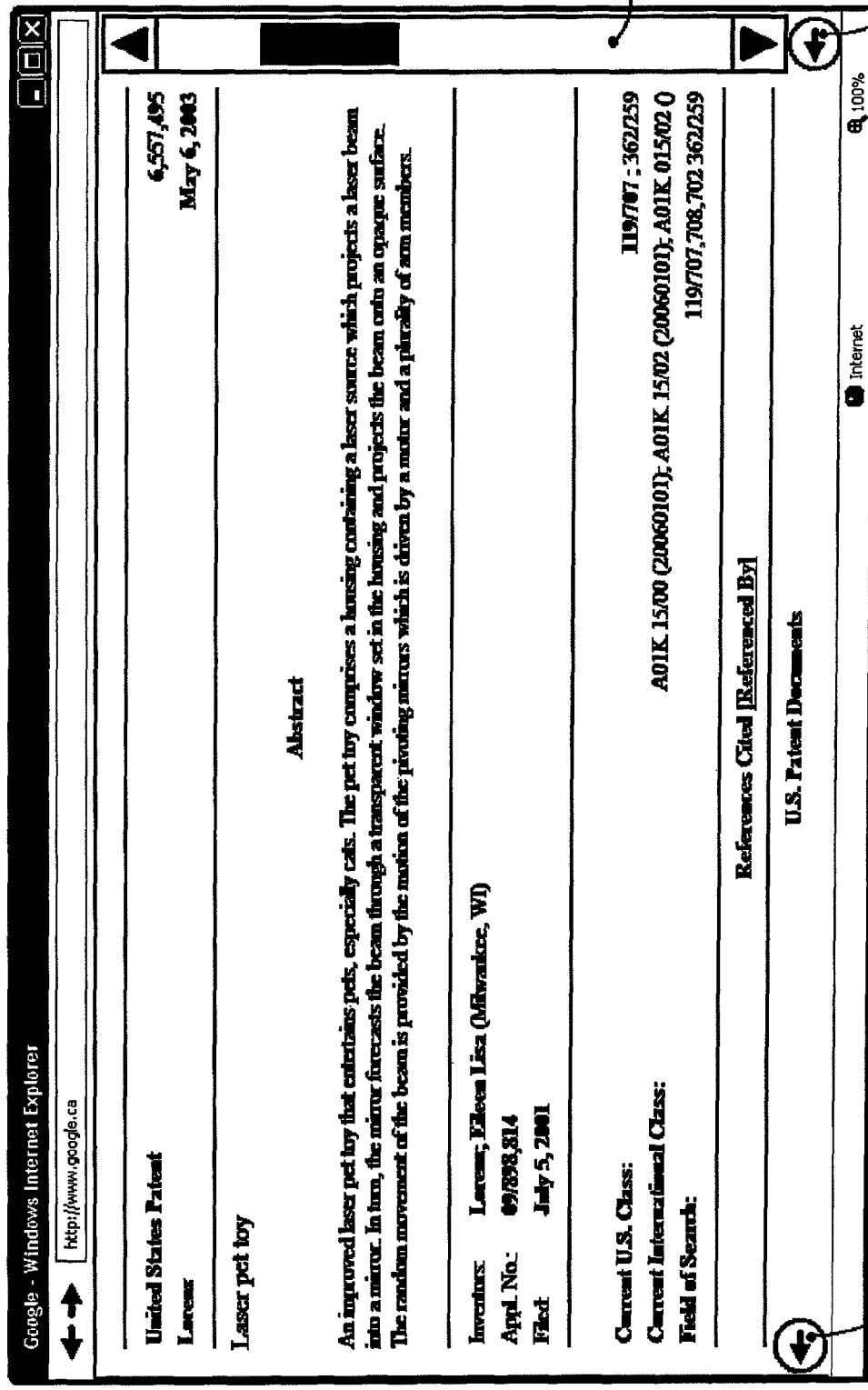
FIG. 11 shows a projected image including a switchable scrollbar.

During calibration the user may also be prompted to identify whether they are left or right-handed. In this case, once the position for the projected image is determined, the personal computer 330 also determines ergonomic locations for toolbars, menus and the like appearing in the projected image depending on the aspect ratio of the projected image and the dominant hand of the user. In most cases, the toolbars and menus are placed along the sides of the projected image. The side of the projected image at which the toolbars and menus are located is determined based on the entered dominant hand. In the case of scrollbars, a scrollbar may be positioned at each side of the projected image. Alternatively, a switchable scrollbar 400 can be used as shown in FIG. 11. Preferably the scrollbar is adjusted to the user's hand size or capabilities. For example, if the user has mobility difficulties, the scrollbar may be sized very large so the scroll bar can be actuated using relatively gross motions. In this case, touch areas 402 represented by arrows surrounded by circles are positioned adjacent opposite bottom corners of the projected image. Touch input made on an area 402 results in the scrollbar 400 being displayed along the side of the projected image associated with that touch area 402.

In a further embodiment, profiles for each user of the touch panel may be stored and retrieved by the personal computer. Each user that uses the touch panel is recognized by the interactive/projection system through an identification mechanism that identifies and associates the user with a particular profile. Examples of identification mechanisms that may be employed comprise RFID keycards, magnetic keycards, facial recognition, or other biometric methods. When the user approaches the touch panel, the user is identified by the interactive input system and the height of the projected image is adjusted according to the saved profile. The interactive input/projector system may also adjust the projected image according to other attributes that may be saved in the user's profile such as left- or right-handedness. The profile may be saved on a network database accessible by the personal computer over a wired or wireless network. Alternatively, the user may have a storage medium, such as a universal serial bus (USB) key or a wireless USB key, which stores the user's profile for the interactive input projection system to retrieve.

FIGS. 12a and 12b show yet another embodiment of an interactive input/projection system similar to that shown in FIGS. 9a and 9b. The interactive input/projection system 500 comprises a touch panel 522 having a touch surface 524. The touch panel 522 communicates with a personal computer 530 that executes one or more applications programs. The personal computer 530 provides video data to a projector 532. The projector 532 in response to received video data from the personal computer 530 projects an image onto a portion of the touch surface 24. A camera device 544 positioned adjacent to or integral with the projector 532 communicates with the personal computer 530. The camera device 544 is oriented so that its field of view at least encompasses the touch surface 524.

The personal computer 530 processes image frames captured by the camera device 544 to detect the existence and position of a user 550 in front of the touch surface 524 in a manner similar to that described in above-incorporated U.S. patent application Ser. No. 11/420,146 to Morrison et al. The personal computer 530 determines the height of the user 550 by detecting the position of the user's head 552 relative to the touch surface 524. Based on the detected position of the user's head 552 relative to the touch surface 524, the personal computer 530 modifies the video image data output to the projector 532 so that the position of the projected image presented on the touch surface 524 is at an ergonomically acceptable location thereby to facilitate user interaction with the projected image. In the case where more than one user is in front of the touch surface 524, the personal computer 530 takes an average of the users' heights and modifies the video image data output to the projector 532 so that the position of the projected image presented on the touch surface 524 is at an ergonomically acceptable location.

Those of skill in the art will appreciate that the image projection methods described above can also be used in non-interactive projection environments where a projected image is presented on a moveable passive display surface or other suitable surface allowing the projected image to follow the surface as it is moved. If a passive display surface is employed, the projection system need not include a personal computer.

Rather than using a personal computer to perform the required image processing and video image data output modifying, if desired, camera devices and/or projectors with processing capabilities can be employed to process acquired image frames and to modify video image data. If no personal computer is employed, the video image data can be supplied to the processor by any suitable video data source.

Although embodiments have been described with specific reference to the drawings, those of skill in the art will appreciate that modifications and variations may be made without departing from the spirit and scope thereof as defined by the appended claims.

What is claimed is:

1. An image projection method comprising:

capturing at least one image of a moveable display surface and processing the at least one image to detect markers associated with said display surface and to determine the position of the display surface within a projection zone of a projection device based on the position of the detected markers, the projection zone being sized to encompass multiple positions of the moveable display surface;

masking the projection zone based on the display surface location to provide a cropped projection zone;

modifying an image to be projected so that it is positioned within the cropped projection zone; and projecting the image to be projected generally only on said display surface.

2. An image projecting method according to claim 1 wherein said projection zone is sized to encompass at least one of different vertical positions and different horizontal positions of said projection surface.

3. An image projecting method according to claim 2 wherein said projection zone is sized to encompass substantially all possible positions of said projection surface.

4. An image projecting method according to claim 2 wherein said determining comprises detecting markers associated with said projection surface.

5. An image projecting method according to claim 4 wherein said markers are mounted about the periphery of said projection surface.

6. An image projecting method according to claim 5 wherein said detecting comprises processing marker output to detect the locations of said markers.

7. An image projecting method according to claim 6 wherein said modifying comprises moving said projected image to the detected locations of said markers.

* * * * *